United States Patent
Anchan et al.

(10) Patent No.: US 9,614,908 B2
(45) Date of Patent: Apr. 4, 2017

(54) SELECTING A LEADER TO PERFORM A FLOOR ARBITRATION FUNCTION FOR A P2P SESSION

(71) Applicant: QUALCOMM Incorporated, San Diego, CA (US)

(72) Inventors: Kirankumar Bhoja Anchan, San Diego, CA (US); Sandeep Sharma, San Diego, CA (US); Vijay Anandrao Suryavanshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/803,753

(22) Filed: Jul. 20, 2015

(65) Prior Publication Data

US 2016/0105500 A1    Apr. 14, 2016

Related U.S. Application Data

(60) Provisional application No. 62/063,251, filed on Oct. 13, 2014.

(51) Int. Cl.
*H04W 4/08* (2009.01)
*H04L 29/08* (2006.01)
(Continued)

(52) U.S. Cl.
CPC ........ *H04L 67/1051* (2013.01); *H04L 67/104* (2013.01); *H04L 67/1093* (2013.01);
(Continued)

(58) Field of Classification Search
None
See application file for complete search history.

(56) References Cited

U.S. PATENT DOCUMENTS

| 7,688,755 B2 | 3/2010 | Xiao et al. |
| 8,103,300 B2 | 1/2012 | Gogic |

(Continued)

FOREIGN PATENT DOCUMENTS

WO    2013169974 A1    11/2013

OTHER PUBLICATIONS

International Search Report and Written Opinion—PCT/US2015/051487—ISA/EPO—Dec. 7, 2015.
(Continued)

*Primary Examiner* — Alex Skripnikov
(74) *Attorney, Agent, or Firm* — Muncy, Geissler, Olds & Lowe, P.C.

(57) ABSTRACT

In an embodiment, a P2P device discovers other P2P devices that belong to a P2P group. The P2P device calculates a reachability vector that indicates each discovered P2P device within a threshold number of P2P hops. The P2P device receives reachability vector(s) for each proximate P2P device in a set of proximate P2P devices discovered via the P2P discovery procedure. The P2P device ranks the P2P device and each proximate P2P device in the set of proximate P2P devices based on the calculated and received reachability vectors. The P2P device identifies a leader (e.g., the P2P device itself and/or one or more of the other P2P devices) that is responsible for performing a floor arbitration function for a P2P session from the ranked P2P devices based on the rankings, and participates in the P2P session by exchanging media in accordance with the floor arbitration function performed by the leader.

30 Claims, 26 Drawing Sheets

(51) Int. Cl.
   *H04W 76/02* (2009.01)
   *H04W 8/00* (2009.01)
   *H04W 4/04* (2009.01)

(52) U.S. Cl.
   CPC .......... *H04W 4/043* (2013.01); *H04W 8/005* (2013.01); *H04W 76/023* (2013.01)

(56) References Cited

U.S. PATENT DOCUMENTS

| | | |
|---|---|---|
| 8,179,801 B2 | 5/2012 | Previdi et al. |
| 2003/0202468 A1 | 10/2003 | Cain et al. |
| 2005/0094574 A1 | 5/2005 | Han et al. |
| 2006/0035657 A1* | 2/2006 | Lim ........................ H04W 4/10 455/518 |
| 2009/0083390 A1 | 3/2009 | Abu-Ghazaleh et al. |
| 2012/0271895 A1 | 10/2012 | Maeenpaeae et al. |
| 2012/0294199 A1* | 11/2012 | Anchan ................... H04W 4/08 370/277 |
| 2014/0059154 A1 | 2/2014 | Hotham |
| 2014/0112244 A1 | 4/2014 | Lindner et al. |
| 2014/0181201 A1 | 6/2014 | Choi |
| 2014/0201280 A1 | 7/2014 | Qi et al. |

OTHER PUBLICATIONS

Liu J., et al., "Group Management for Mobile Ad Hoc Networks: Design, Implementation and Experiment," Proceedings of the 6th international conference on Mobile data management (MDM), 2005, pp. 192-199.

* cited by examiner

SELECTING A LEADER TO PERFORM A FLOOR ARBITRATION FUNCTION FOR A P2P SESSION

CLAIM OF PRIORITY UNDER 35 U.S.C. §119

The present application for patent claims priority to Provisional Application No. 62/063,251, entitled "SELECTING A LEADER TO PERFORM A FLOOR ARBITRATION FUNCTION FOR A P2P SESSION", filed Oct. 13, 2014, by the same inventors as the subject application, assigned to the assignee hereof and hereby expressly incorporated by reference herein in its entirety.

BACKGROUND

1. Field

Embodiments of the invention relate to selecting a leader to perform a floor arbitration function for a peer-to-peer (P2P) session.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). LTE-D operates as a synchronous system that is battery efficient, and can concurrently detect thousands of services in proximity.

SUMMARY

In an embodiment, a P2P device discovers other P2P devices that belong to a P2P group. The P2P device calculates a reachability vector that indicates each discovered P2P device within a threshold number of P2P hops. The P2P device receives reachability vector(s) for each proximate P2P device in a set of proximate P2P devices discovered via the P2P discovery procedure. The P2P device ranks the P2P device and each proximate P2P device in the set of proximate P2P devices based on the calculated and received reachability vectors. The P2P device identifies a leader (e.g., the P2P device itself and/or one or more of the other P2P devices) that is responsible for performing a floor arbitration function for a P2P session from the ranked P2P devices based on the rankings, and participates in the P2P session by exchanging media in accordance with the floor arbitration function performed by the leader.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
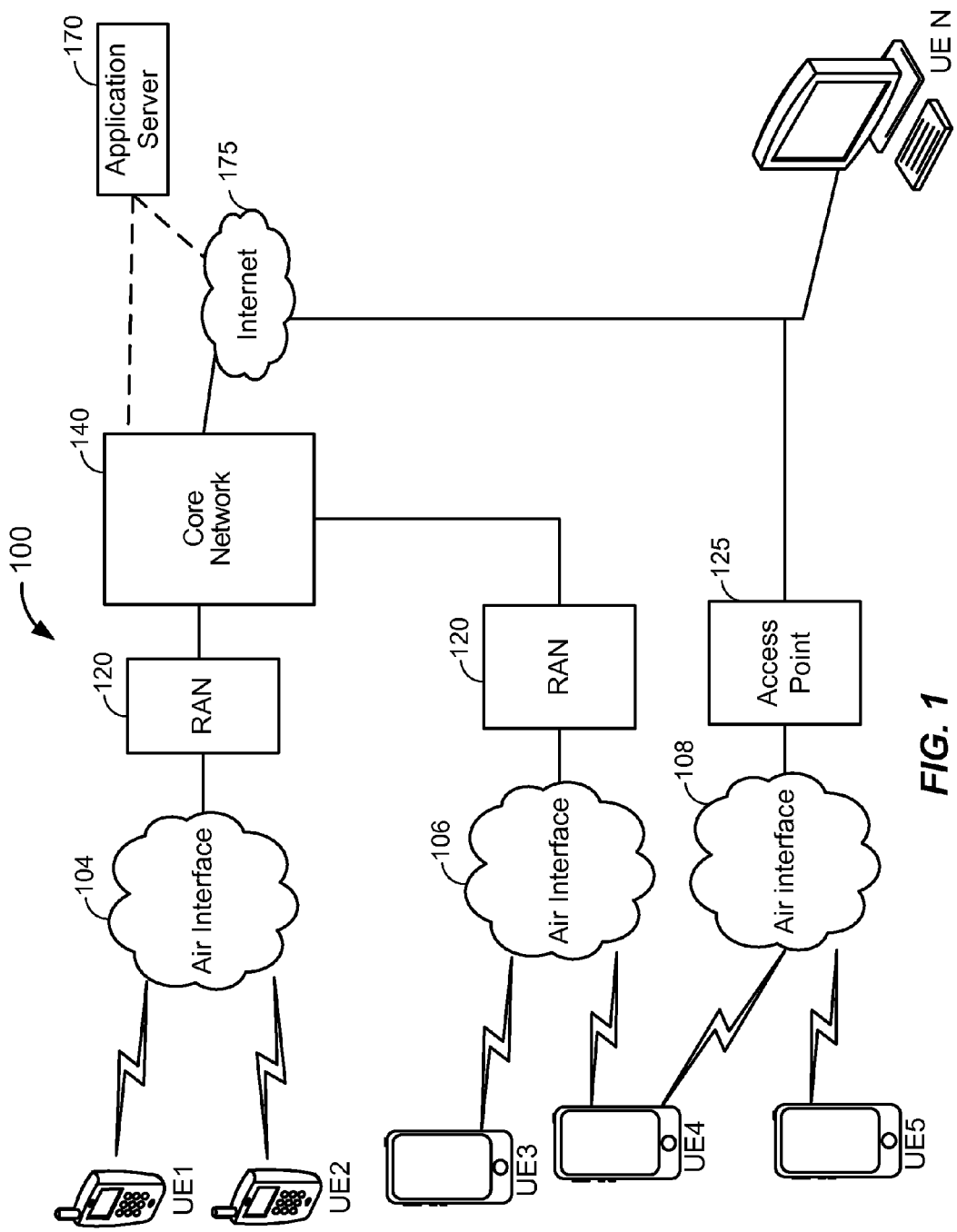
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
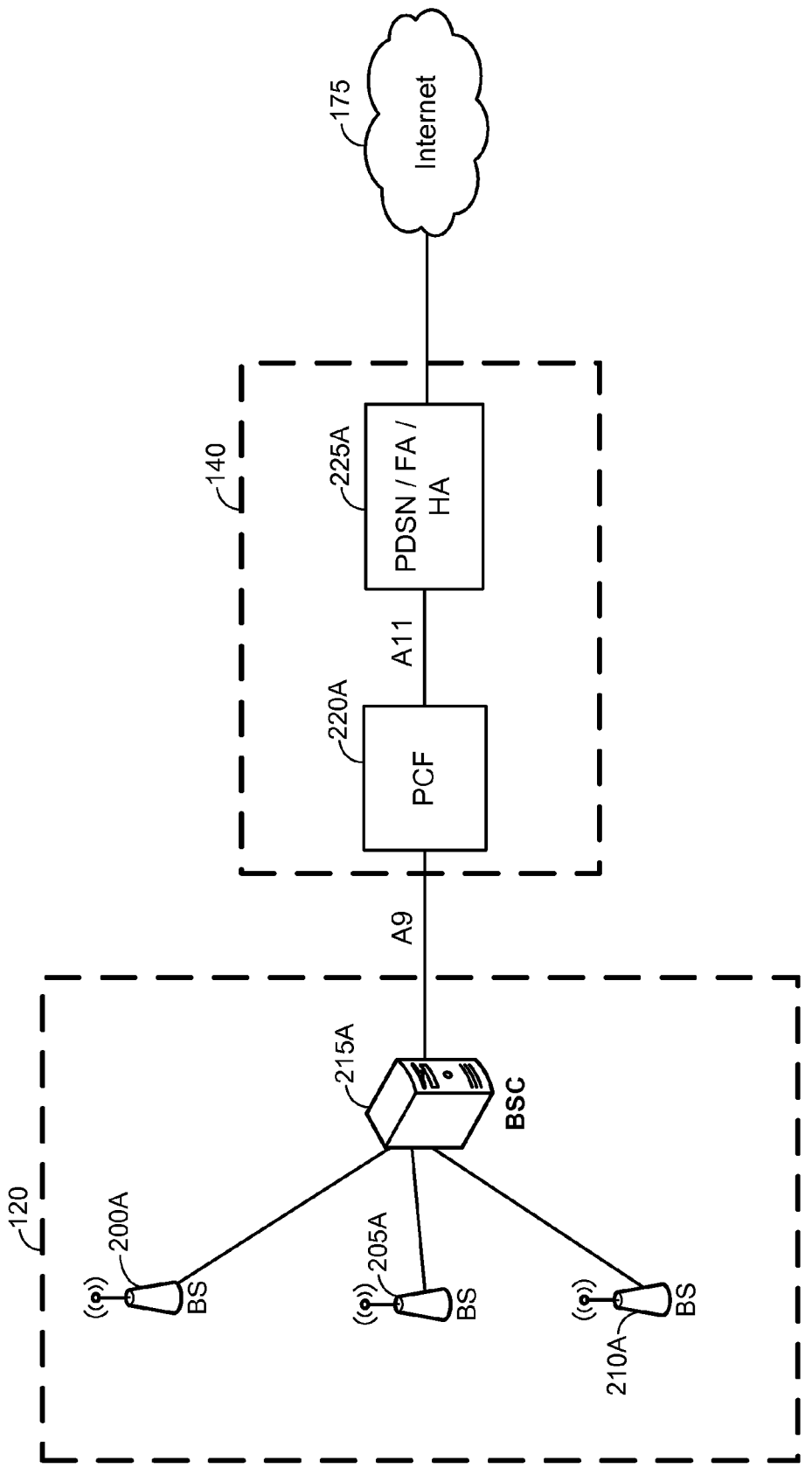
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point Protocol (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
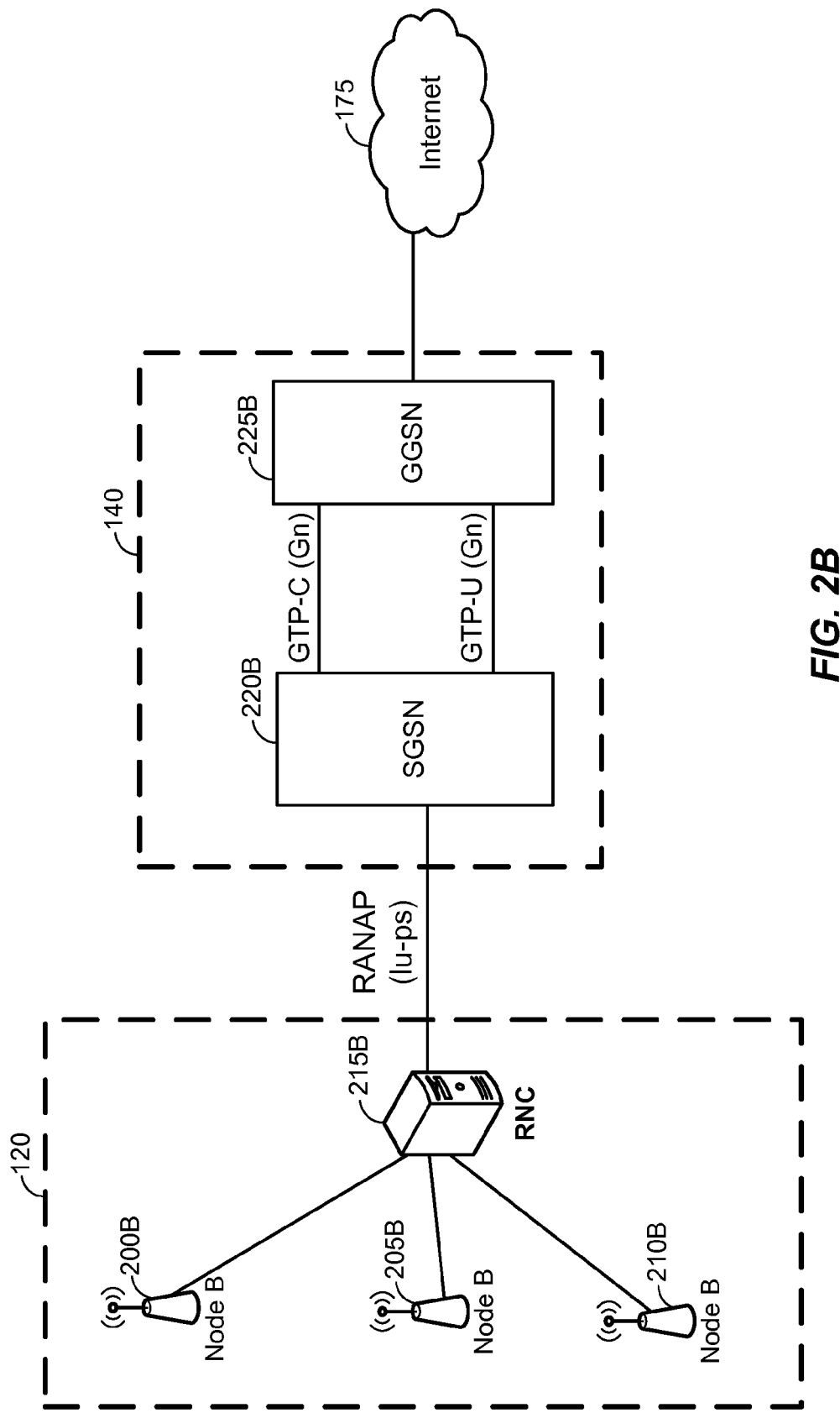
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
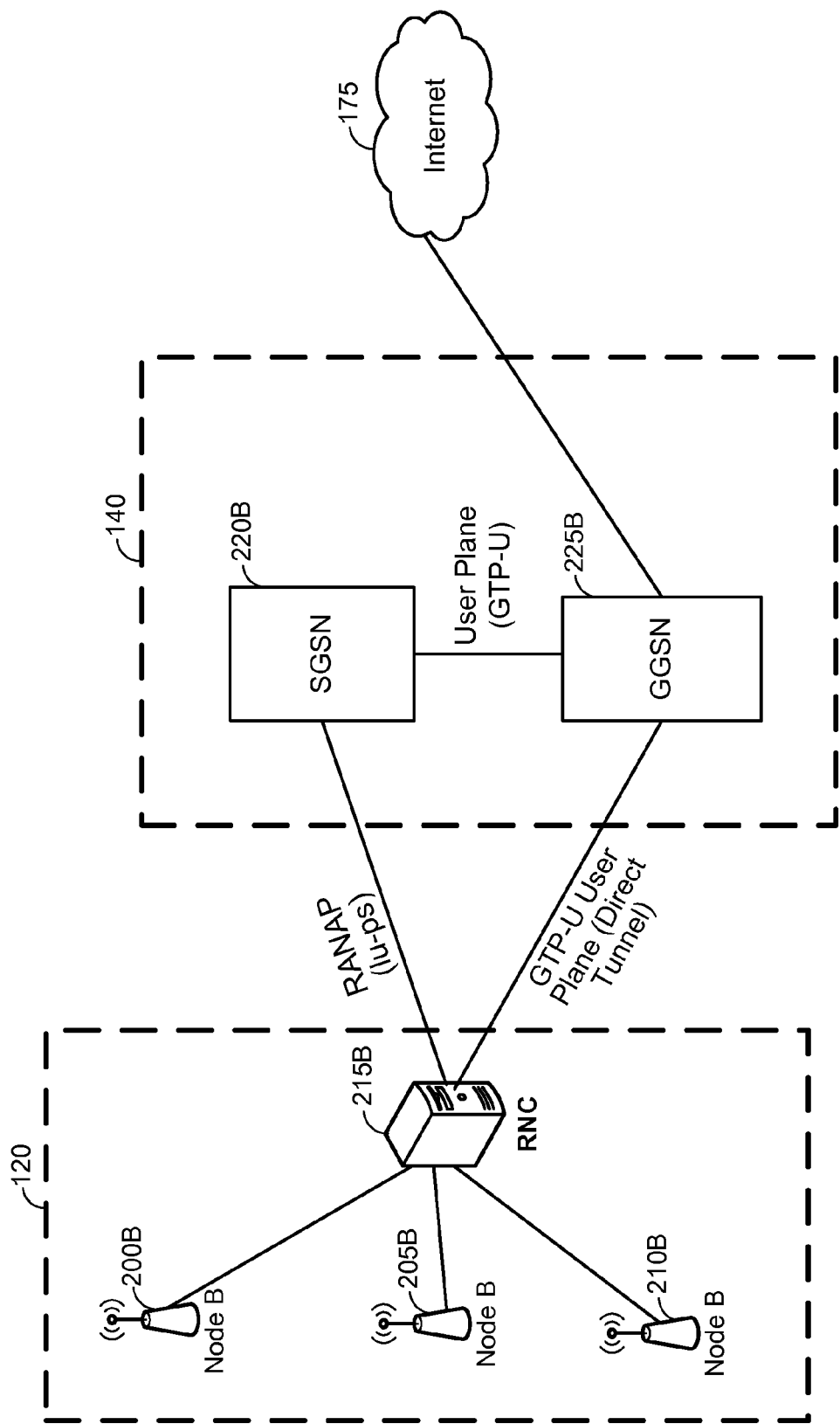
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
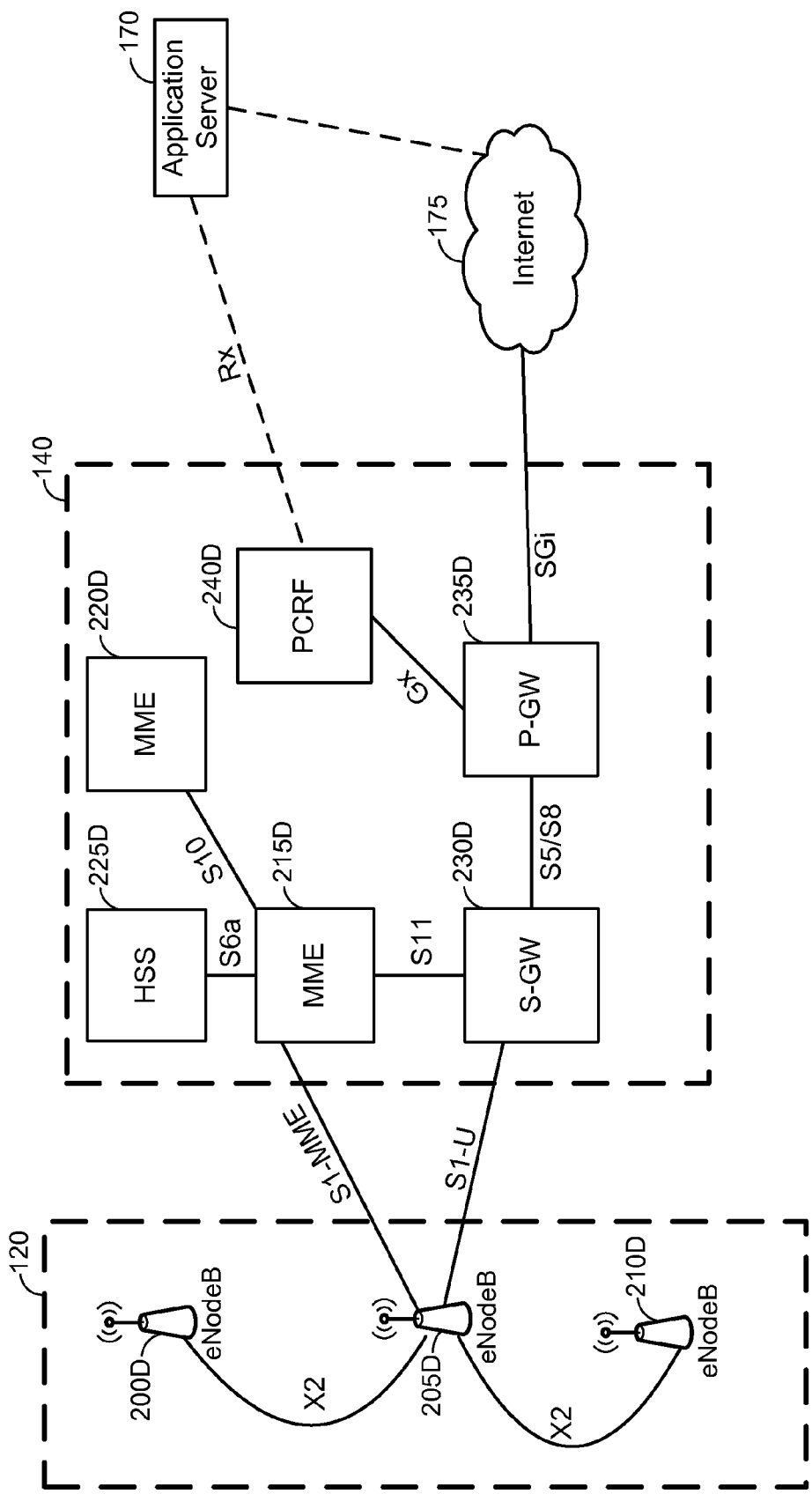
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy and Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
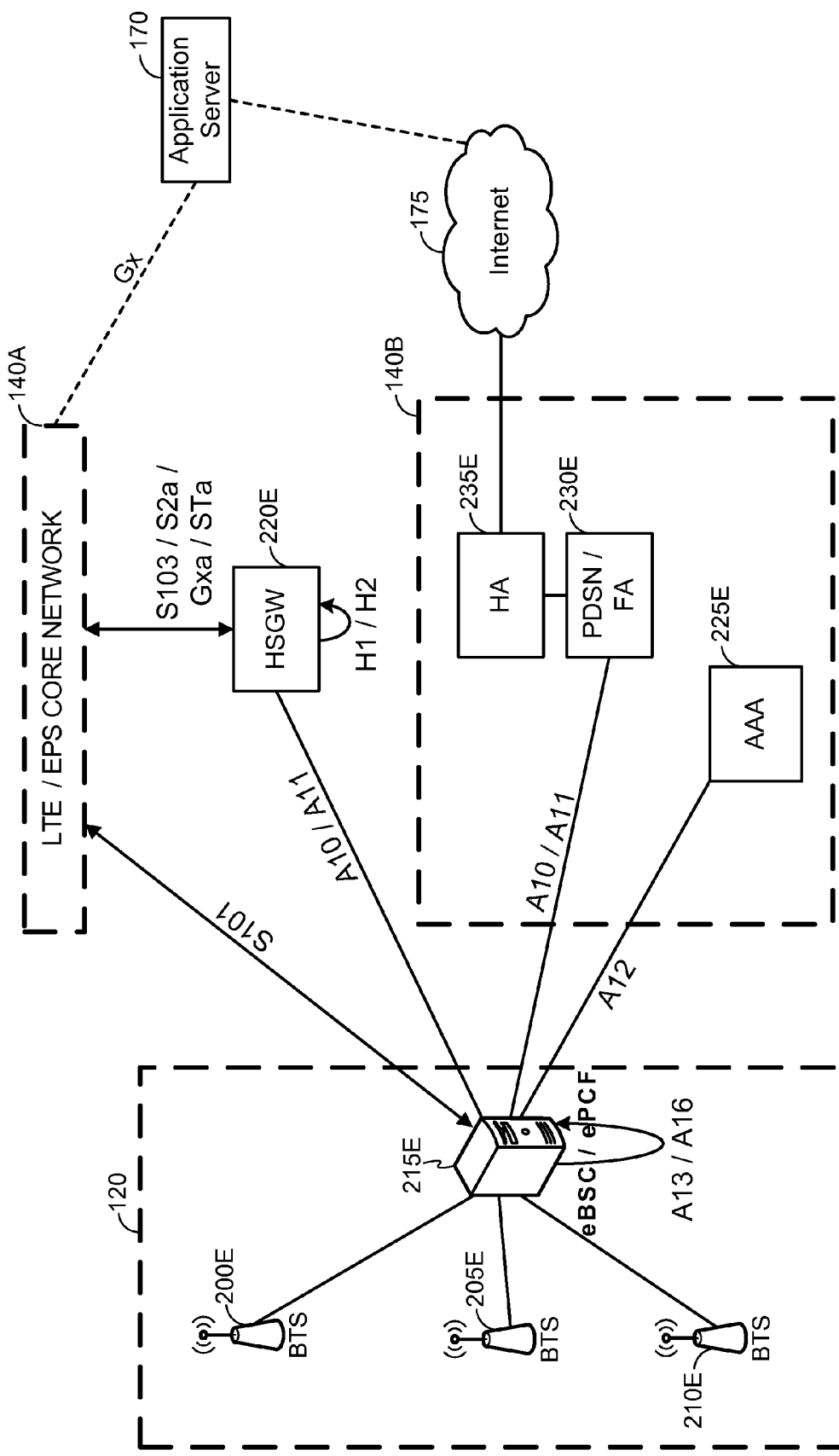
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
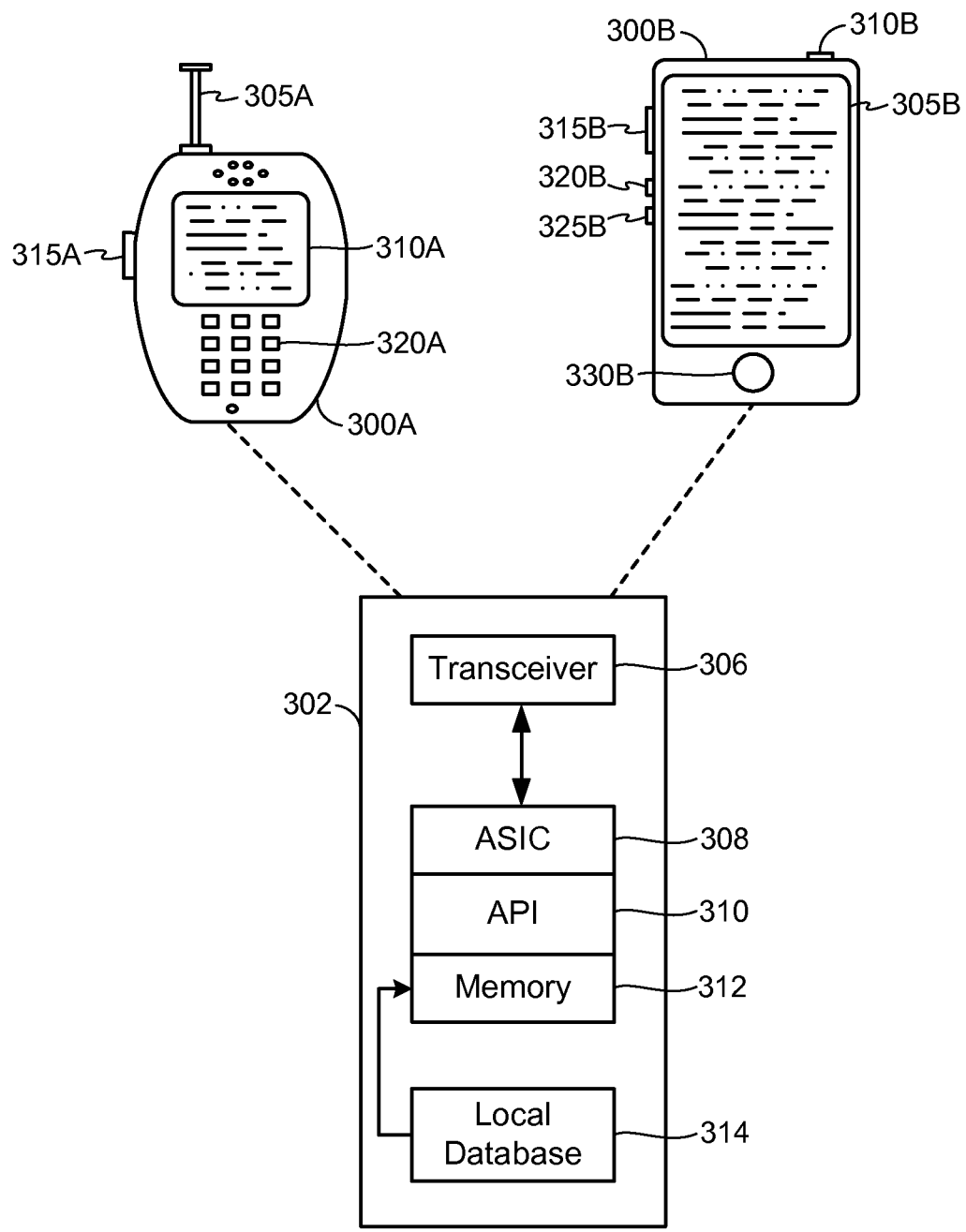
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
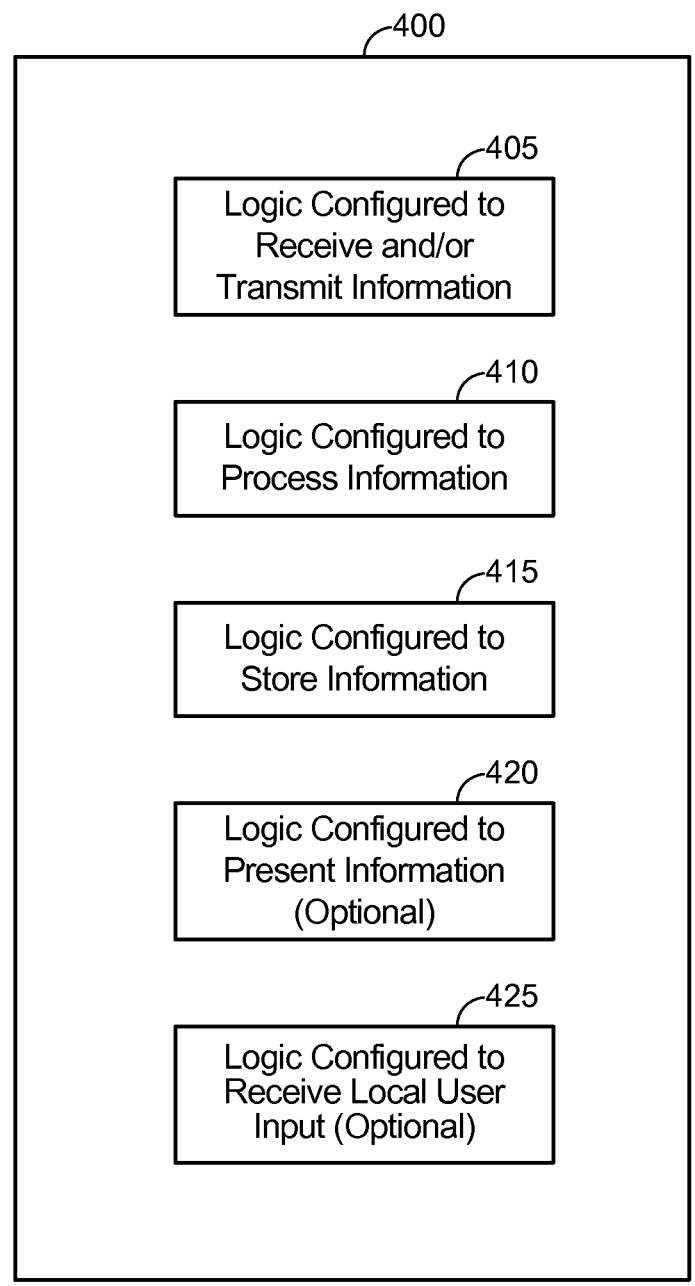
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
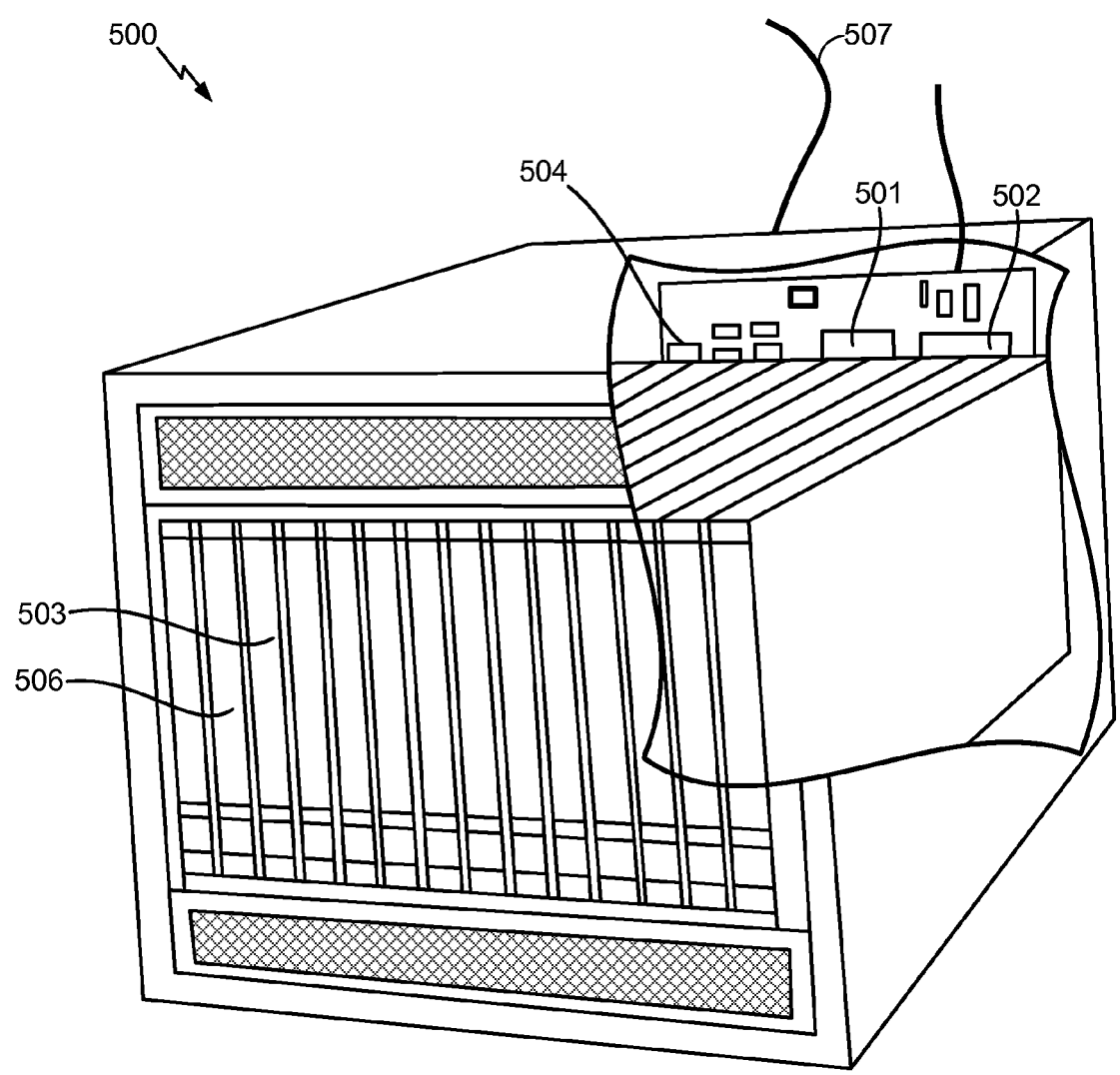
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
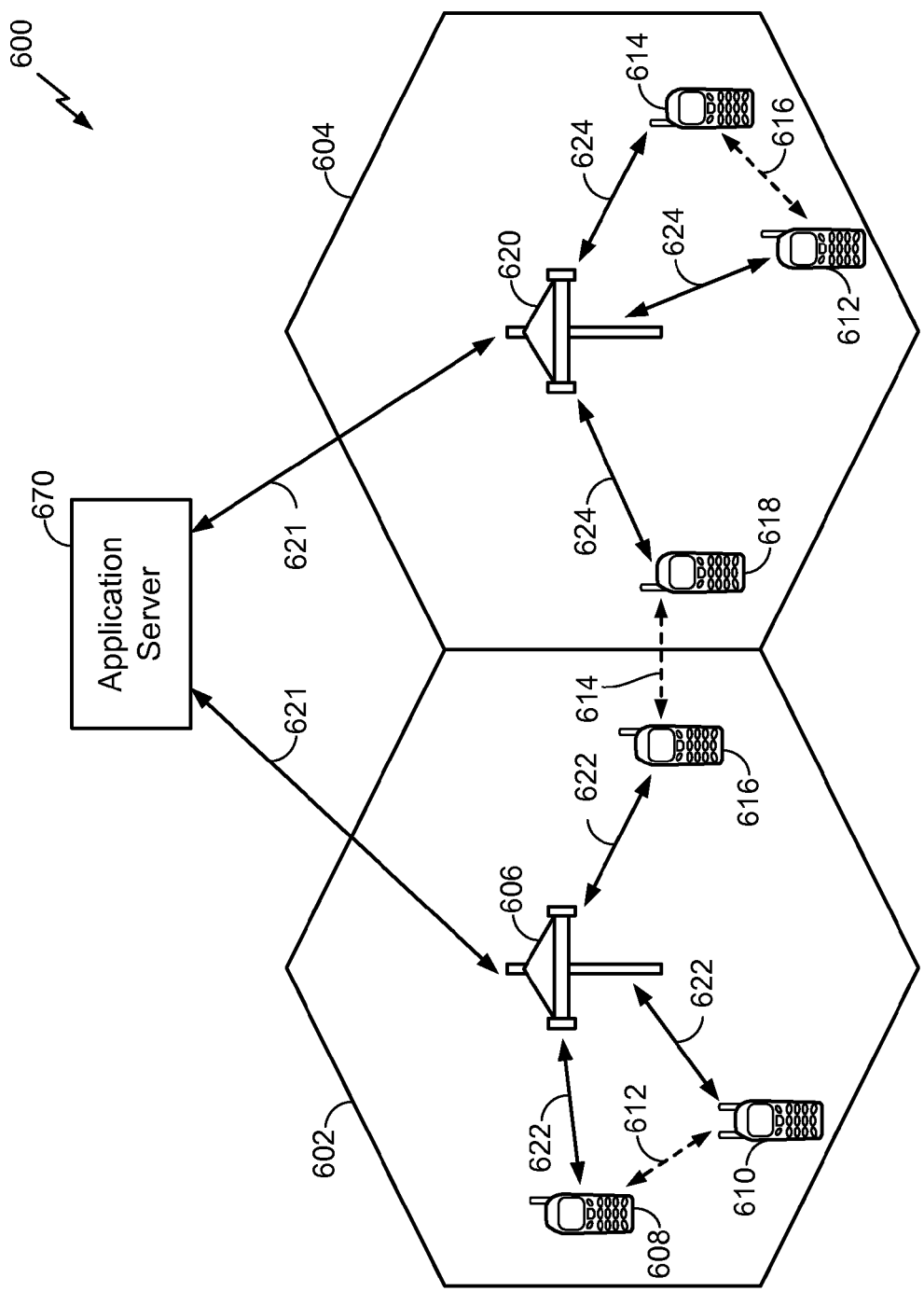
FIG. 6 illustrates a wireless communications system whereby UEs can be connected directly to other UEs using D2D P2P technology while also connecting to a Wireless Wide Area Network (WWAN) in accordance with an embodiment of the invention.

FIG. 6 illustrates a wireless communications system 600 whereby UEs can be connected directly to other UEs using D2D P2P technology (e.g., LTE Direct (LTE-D), WiFi Direct (WFD), Bluetooth, etc.) while also connecting to a Wireless Wide Area Network (WWAN), such as an LTE network for example. Referring to FIG. 6, an application server 670 (e.g., the application server 170 in FIG. 1, FIG. 2D, FIG. 2E, etc.) is connected to a first cell 602 having a first base station 606, a second cell 604 having a second base station 620, and the application server 670 coupled to the first base stations 606 and the second base station 620 via a network link 621 (e.g., the Rx link of FIG. 2D, the Gx link of FIG. 2E, etc.). The coverage area of a given base station is represented by the cell in which the given base station is located, whereby for purposes of discussion, the first cell 602 includes the coverage area corresponding to the first base station 606 and the second cell 604 includes the coverage area corresponding to the second base station 620. Each the cells 602, 604 in the wireless communications system 600 include various UEs that communicate with the respective base stations 606, 620 and with the application server 670 via the respective base stations 606, 620. For example, in the embodiment illustrated in FIG. 6, the first cell 602 includes UE 608, UE 610, and UE 616, while the second cell 604 includes UE 612, UE 614, and UE 618, wherein one or more of the UEs in the wireless communications system 600 may be mobile or other wireless devices. Although not shown in FIG. 6, in some embodiments the base stations 606, 620 may be connected to one another via a backhaul link.

In accordance with various exemplary embodiments described herein, one or more of UE 608, UE 610, UE 616, UE 612, UE 614, and UE 618 may support direct (or D2D) P2P communications, whereby such UEs may support communicating with one another directly without having to communicate through another device or a network infrastructure element such as the first base station 606 and the second base station 620 and also support communications through the network infrastructure elements such as the first base station 606 and/or the second base station 620. In communications that involve network infrastructure, signals may generally be transmitted and received through uplink and downlink connections between various UEs and the base stations 606, 620, such as link 622 in the first cell 602 and link 624 in the second cell 604. Each of the base stations 606, 620 generally serve as the attachment point for the UEs in the corresponding cells 602, 604 and facilitate communications between the UEs served therein. In accordance with one aspect, when two or more UEs, such as UE 608 and UE 610, wish to communicate with one another and are located in sufficient proximity to each other, then a direct P2P link can be established therebetween, which may offload traffic from the base station 606 serving the UEs 608, 610, allow UEs 608, 610 to communicate more efficiently, or provide other advantages that will be apparent to those skilled in the art.

As shown in FIG. 6, the UE 612 can communicate with UE 614 through intermediate base station 620 via link 624, and UEs 612, 614 may further communicate via a P2P link 616. Furthermore, for inter-cell communications where the participating UEs are in different nearby cells, a direct P2P communications link is still a possibility, which is illustrated in FIG. 6 where UE 616 and UE 618 may communicate using direct P2P communications illustrated by dashed link 614.

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). LTE-D operates as a synchronous system that is battery efficient, and can concurrently detect thousands of services in proximity. LTE-D has a wider range than other D2D P2P technologies, such as WiFi Direct (WFD) or Bluetooth.

LTE-D operates on licensed spectrum as a service to mobile applications. LTE-D is a device-to-device (D2D) solution that enables service layer discovery and also D2D communication. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and notify the client application when it detects a match to a "monitor" established by an associated application. For example, the application can establish a monitor for "tennis events", and the LTE-D discovery layer can wake-up the application when a tennis-related LTE-D message is detected.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D relies upon "Expressions" for both discovery of proximate peers and facilitating communication between proximate peers. Expressions at the application or service layer are referred to as "Expression Names" (e.g., ShirtSale@Gap.com, Jane@Facebook.com, etc.). Expression Names at the application layer are mapped to bit-strings at the physical layer that are referred to as "Expression Codes". In an example, each Expression Code can have a length of 192 bits (e.g., "11001111 . . . 1011", etc.). As will be appreciated, any reference to a particular Expression can be used to refer to the Expression's associated Expression Name, Expression Code or both, depending upon the context. Expressions can be either Private or Public. Public Expressions are made public and can be identified by any application, whereby Private Expressions are targeted for specific audiences. Expressions can be configured to identify and characterize LTE-D groups, or alternatively can be configured to identify and characterize individual LTE-D devices.

Public Expressions can be externally provisioned by a server (AES), in which case the Public Expressions are referred to as public managed expressions which can be provisioned at the LTE-D device via out-of-band signaling. Public Expressions can alternatively be managed locally by the client application on the LTE-D device itself, in which case the Public Expressions are referred to as unmanaged expressions.

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices to are announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

For example, assume that each LTE-D device periodically transmits an individual P2P discovery message (or "I_P2PDM") at the 20 second interval. Each I_P2PDM individually identifies the LTE-D device that transmits the I_P2PDM. For example, in LTE-D, the I_P2PDM can include the Private or Public Expression for the associated LTE-D device. One or more LTE-D devices that belong to a particular LTE-D group may also be assigned the task of periodically transmitting a group P2P discovery message (or "G_P2PDM") on a periodic basis, which may be the same or different from the interval at which the I_P2PDMs are transmitted. In LTE-D, the G_P2PDM can include the Private or Public Expression for the associated LTE-D group itself, as opposed to the I_P2PDM which carried the Private or Public Expression for an individual LTE-D device. In an example, less than all of the LTE-D group members may be asked to transmit the G_P2PDM to reduce interference and improve battery life in scenarios where a high number of proximate LTE-D group members are present.

Figure 7A:
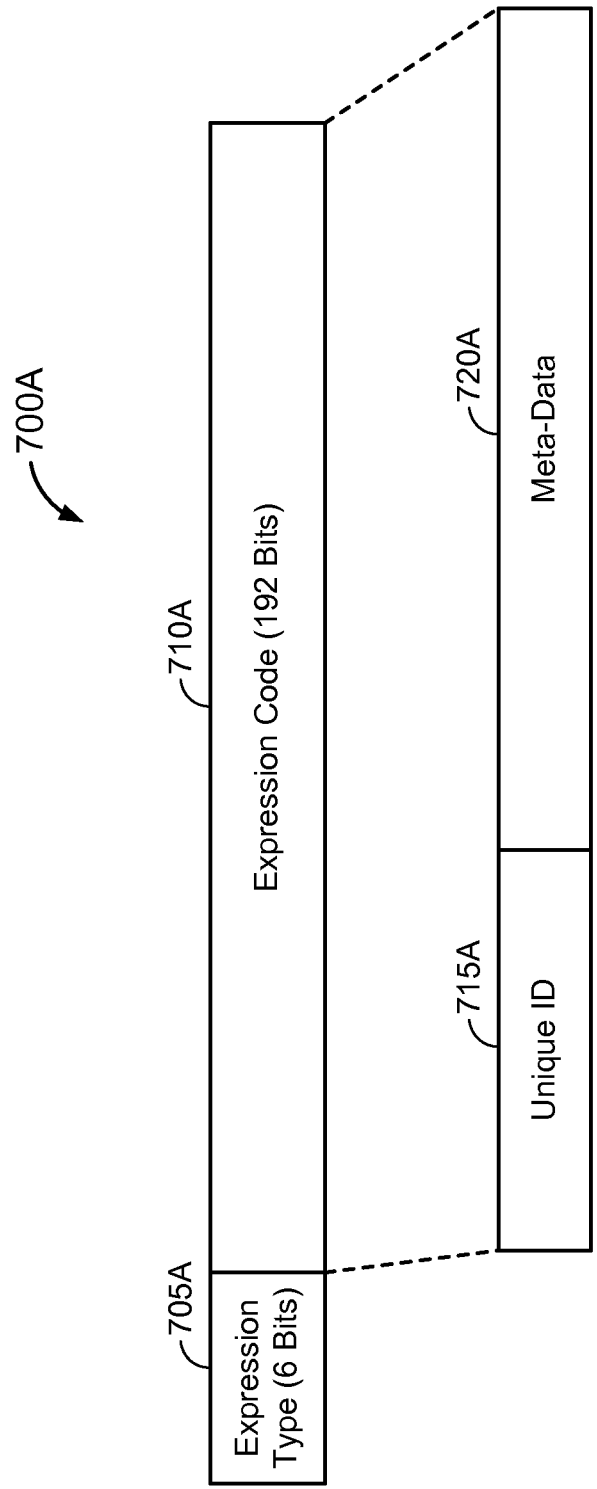
FIG. 7A illustrates an individual P2P discovery message for LTE-D in accordance with an embodiment of the present invention.

FIG. 7A illustrates an I_P2PDM 700A for LTE-D in accordance with an embodiment of the present invention. Referring to FIG. 7A, the I_P2PDM 700A includes a 6-bit Expression Type Field 705A, and a 192-bit Expression Code Field 710A. The 192-bit Expression Code Field 710A includes a Unique Identifier for a particular P2P group member, 715A and one or more "metadata" fields, 720A. The metadata fields 720A can include various types of data, such as an application or service identifier (e.g., PTT, etc.), presence information (e.g., "Busy", "Available for Voice Communication", "Available for Text Communication, etc.), and so on. Other potential metadata fields that can be populated within the one or more metadata fields 720A include an operator domain mapping field (e.g., Sprint, Verizon, etc.), and so on.

Figure 7B:
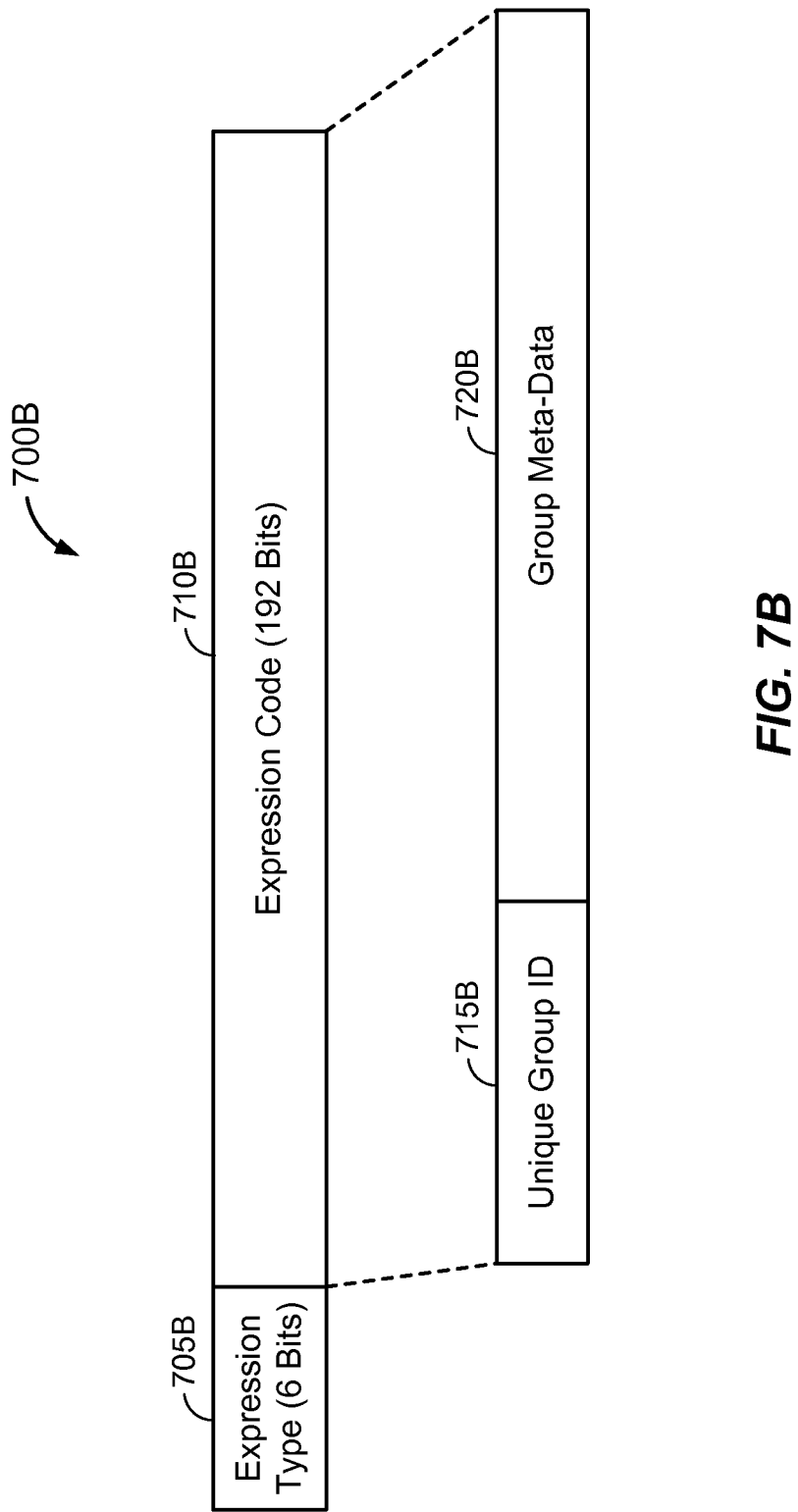
FIG. 7B illustrates a group P2P discovery message for LTE-D in accordance with an embodiment of the present invention.

FIG. 7B illustrates a G_P2PDM 700B for LTE-D in accordance with an embodiment of the present invention. Referring to FIG. 7B, the G_P2PDM 700B includes a 6-bit Expression Type Field 705B, and a 192-bit Expression Code Field 710B. The 192-bit Expression Code Field 710B includes a unique group ID field that identifies a particular LTE-D group (e.g., unique within a particular operator domain, and not necessarily globally unique, etc.), 715B, and one or more group "metadata" fields, 720B. The metadata fields 720B can include various types of data, such as an application or service identifier (e.g., PTT, etc.), individual or group-specific presence information, etc. Other potential metadata fields that can be populated within the one or more metadata fields 720B include an operator domain mapping field (e.g., Sprint, Verizon, etc.), a group type (e.g., a closed group, a chatroom or public group, etc.).

For successful half-duplex group communication in a P2P environment in "direct mode" (e.g., LTE-D, WiFi Direct, or any other direct mode without wireless local area network (WLAN) or wireless wide area network (WWAN) support for data transfer), proper selection of a floor arbitrator for half-duplex communication sessions is crucial for effective floor management. Conventional selection schemes for a floor arbitrator in direct mode in P2P environments generally do not account for mobility, require a fully connected topology where each session participant is in direct communication range with each other session participant (i.e., no "hops"), can suffer from misallocation of floor resources (e.g., one session participant is "starved" for floor access while another session participant hogs the floor), there is a single point of failure (e.g., the session may be fail if the floor arbitrator moves out of range of the other session participants or otherwise drops out of the session), and in-session latency performance may be reduced somewhat as a result of identifying the floor arbitrator during the session. Some of these issues related to conventional floor arbitration schemes are shown below with respect to FIGS. 8-9.

Figure 8:
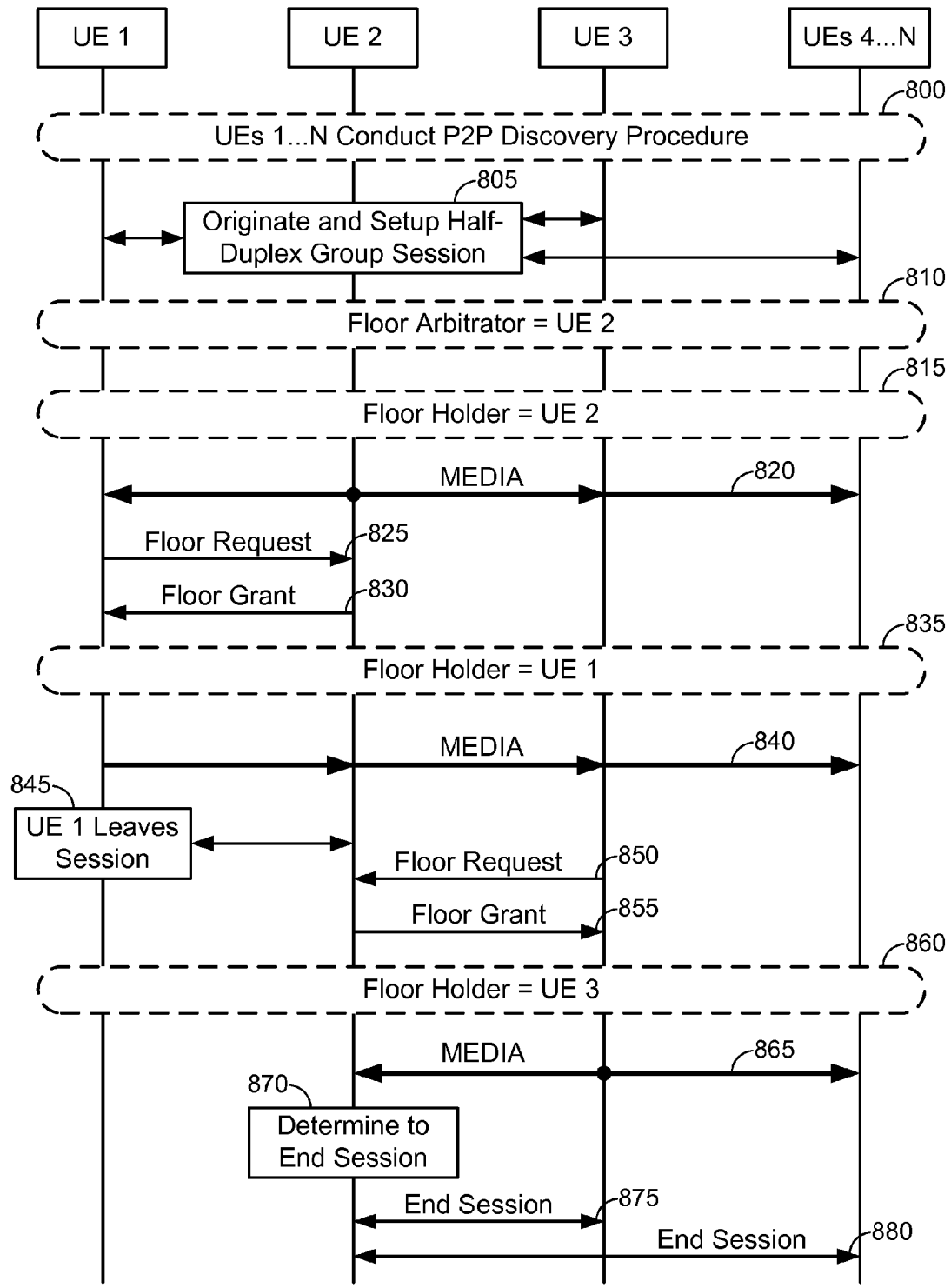
FIG. 8 illustrates a conventional process of setting up a half-duplex group communication session via P2P.

FIG. 8 illustrates a conventional process of setting up a half-duplex group communication session via P2P. Referring to FIG. 8, assume that UEs 1 . . . N belong to a P2P group, are in direct communication range of each other and perform a P2P discovery procedure to detect each other's presence, 800. The P2P discovery procedure can be conducted over a P2P interface in an example, such as an LTE-D discovery interface or a WiFi Direct discovery interface. At some later point in time while UEs 1 . . . N are still in direct communication range with each other, UE 2 originates and initiates setup of a half-duplex group communication session (or P2P session), 805.

In FIG. 8, assume that the floor arbitrator selection scheme for the P2P group is that the floor arbitrator for the P2P session is set to the session originator. This is a simple way to select the floor arbitrator, but has certain drawbacks (e.g., the session may terminate automatically if the session originator drops out of the session, the session originator may not be in an optimal position relative to the other session participants for performing the floor arbitration function, etc.). Accordingly, each of UEs 1 and 3 . . . N agree to join the P2P session initiated by UE 2, with UE 2 established as floor arbitrator for the P2P session by virtue of being the session originator, 810. Also, UE 2 is established as the initial floorholder for the P2P session by virtue of being the session originator, 815.

At this point, UE 2 begins to transmit media over the P2P interface to the UEs 1 and 3 . . . N, 820. At some later point during the P2P session, UE 1 sends a floor request to UE 2 (e.g., via a unicast message over the P2P interface, which can alternatively be referred to as a unicast channel of the P2P interface), 825. The floor request is granted by UE 2, and UE 2 sends a floor grant message back to UE 1 (e.g., via a unicast message), 830. UE 2 also notifies UEs 3 . . . N that UE 1 is the new floorholder for the P2P session, 835.

At this point, UE 1 begins to transmit media over the P2P interface to the UEs 2 . . . N, 840. At some later point during the P2P session, assume that UE 1 leaves the P2P session (e.g., UE 1 moves outside of direct communication range with one or more of UEs 2 . . . N, an operator of UE 1 decides to end participation in the session, etc.), 845. After UE 1 leaves the P2P session, UE 3 sends a floor request to UE 2 (e.g., via a unicast message), 850. The floor request is granted by UE 2, and UE 2 sends a floor grant message back to UE 3 (e.g., via a unicast message), 855. UE 2 also notifies UEs 1 and 4 . . . N that UE 3 is the new floorholder for the P2P session, 860. At this point, UE 3 begins to transmit media over the P2P interface to the UEs 2 and 4 . . . N, 865. At some later point during the P2P session, assume that UE 2 determines to end the P2P session, 870. UE 2 thereby messages the remaining session participants (i.e., UEs 3 . . . N) to notify them of the session termination, 875 and 880.

Figure 9:
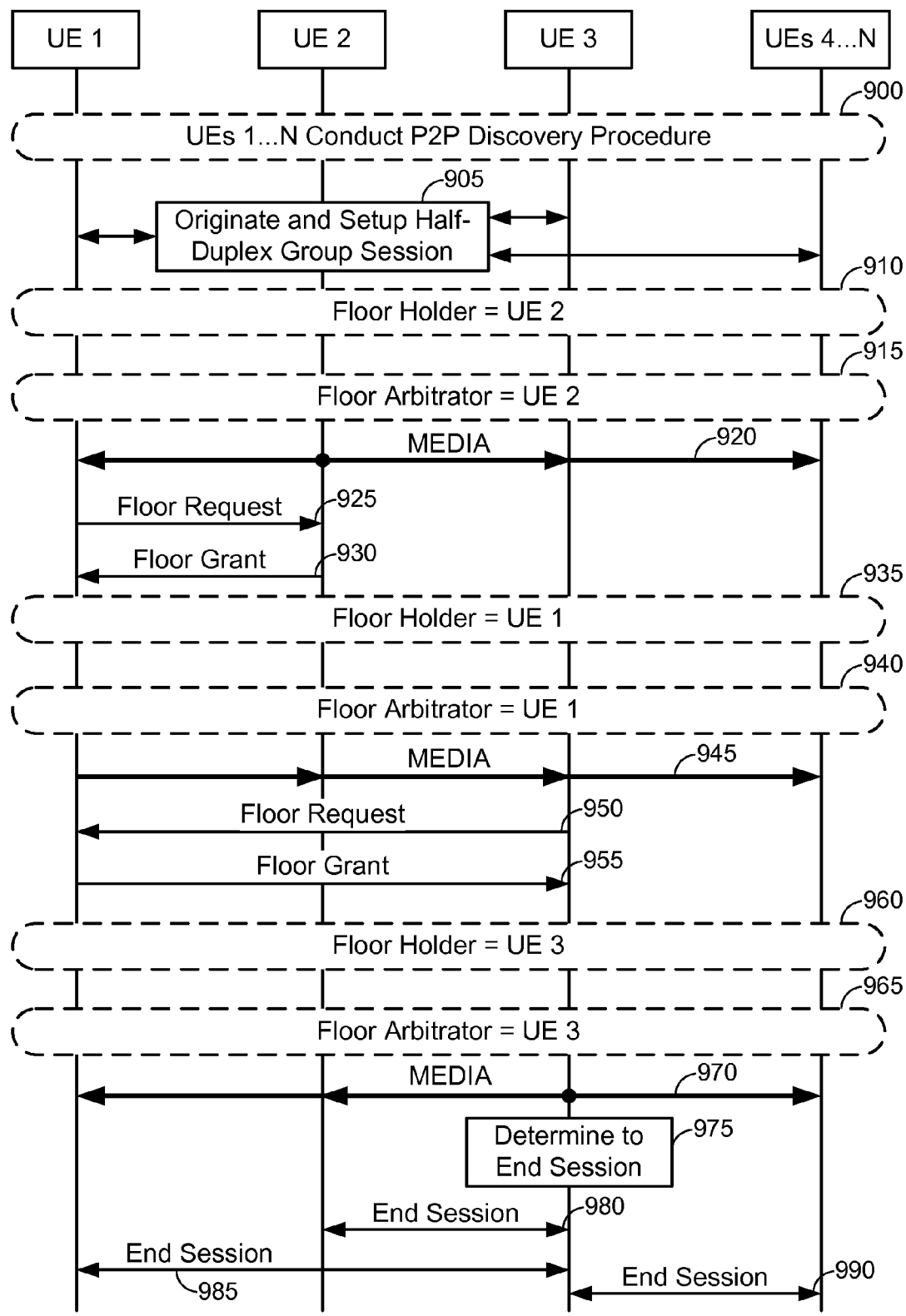
FIG. 9 illustrates another conventional process of setting up a half-duplex group communication session via P2P.

FIG. 9 illustrates another conventional process of setting up a half-duplex group communication session via P2P. Unlike FIG. 8 where the floor arbitrator corresponds to the session originator, assume that the floor arbitrator selection scheme for the P2P group in FIG. 9 is that the floor arbitrator for the half-duplex group communication session (or P2P session) is set to a current floorholder. Accordingly, the floor arbitrator may change over time during the P2P session as the floor changes hands.

Referring to FIG. 9, assume that UEs 1 . . . N belong to a P2P group, are in direct communication range of each other and perform a P2P discovery procedure to detect each other's presence, 900. The P2P discovery procedure can be conducted over a P2P interface in an example, such as an LTE-D discovery interface or a WiFi Direct discovery interface. At some later point in time while UEs 1 . . . N are still in direct communication range with each other, UE 2 originates and initiates setup of a P2P session, 905. Each of UEs 1 and 3 . . . N agree to join the P2P session initiated by UE 2, with UE 2 established as the initial floorholder for the P2P session, 910 and thereby also established as the initial floor arbitrator for the P2P session by virtue of being the floorholder, 910 and 915.

At this point, UE 2 begins to transmit media over the P2P interface to the UEs 1 and 3 . . . N, 920. At some later point during the P2P session, UE 1 sends a floor request to UE 2 (e.g., via a unicast message), 925. The floor request is granted by UE 2, and UE 2 sends a floor grant message back to UE 1 (e.g., via a unicast message), 930. The P2P group is notified that UE 1 is the new floorholder for the P2P session, 935. Further, because the floor arbitrator selection scheme for the P2P group in FIG. 9 is that the floor arbitrator for the P2P session is set to a current floorholder, UE 1 also becomes the new floor arbitrator for the P2P session, and the P2P group is notified of the floor arbitrator transition, 940.

Referring to FIG. 9, UE 1 begins to transmit media over the P2P interface to the UEs 2 . . . N, 945. At some later point during the P2P session, UE 3 sends a floor request to UE 1 (e.g., via a unicast message), 950. The floor request is granted by UE 1, and UE 1 sends a floor grant message back to UE 3 (e.g., via a unicast message), 955. The P2P group is notified that UE 3 is the new floorholder for the P2P session, 960. Further, because the floor arbitrator selection scheme for the P2P group in FIG. 9 is that the floor arbitrator for the P2P session is set to a current floorholder, UE 3 also becomes the new floor arbitrator for the session, and the P2P group is notified of the floor arbitrator transition, 965. At this point, UE 3 begins to transmit media over the P2P interface to the UEs 2 . . . N, 970. At some later point during the P2P session, assume that UE 3 determines to end the communication session, 975. UE 2 thereby messages the remaining session participants (i.e., UEs 1, 2 and 4 . . . N) to notify them of the session termination, 980, 985 and 990.

As noted above, FIGS. 8-9 describe half-duplex group communication sessions that occur in a P2P environment that has a network topology suitable for direct communication between all session participants. An example of this type of P2P network topology is shown in FIG. 10 via P2P network topology 1000.

Figure 10:
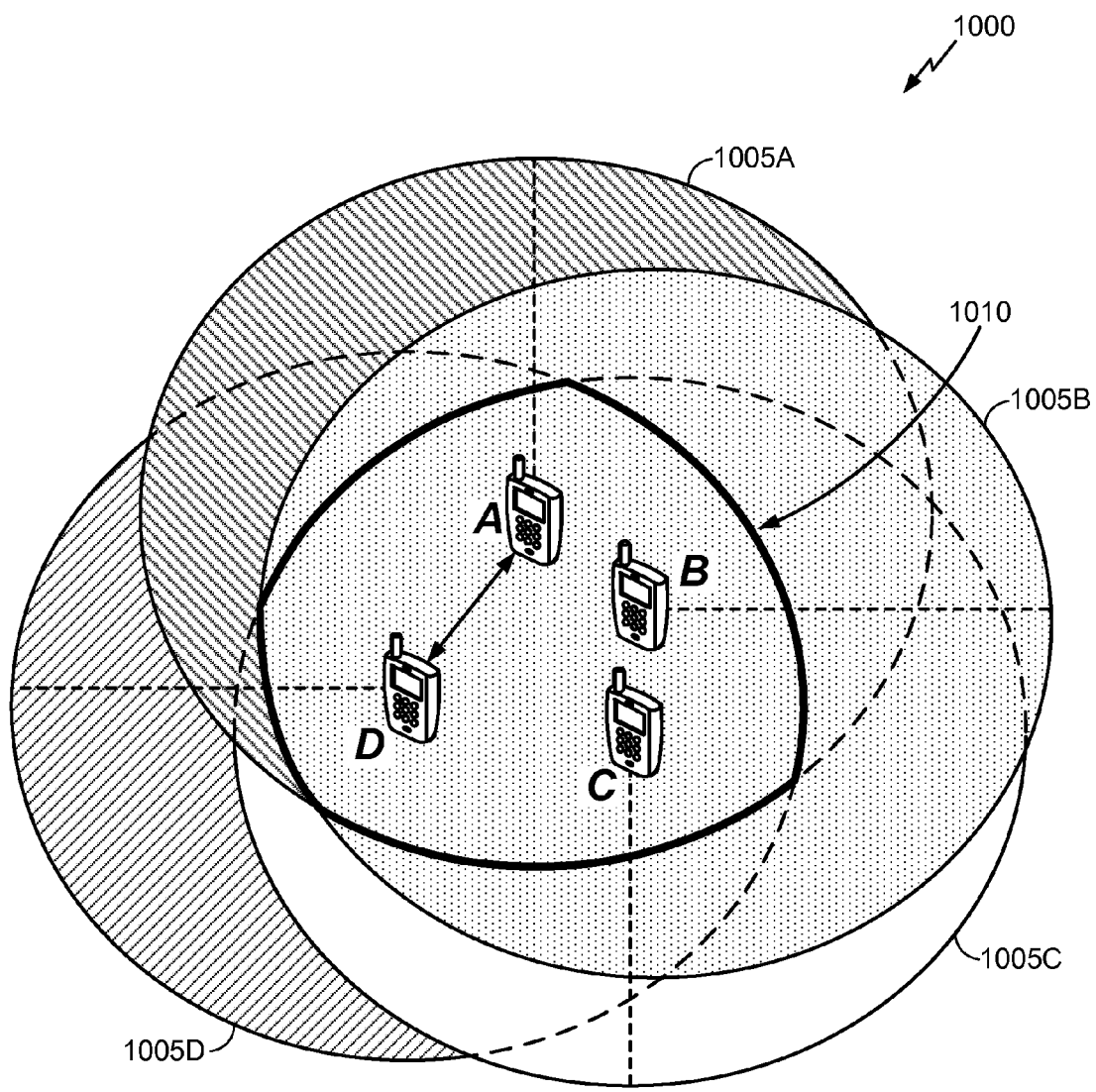
FIG. 10 illustrates an example of P2P network topology.

Referring to FIG. 10, assume that UEs A . . . D are each part of the same P2P group, and are equipped with P2P communication hardware (e.g., an LTE-D transceiver, a WiFi Direct transceiver, etc.) that permits UEs A . . . D to directly communicate via a P2P interface with one or more other P2P devices within direct communication ranges 1005A . . . 1005D, respectively. In FIG. 10, each of UEs A . . . D is positioned within an overlapping direct communication range region 1010 of each other UE, such that UEs A . . . D can each directly communicate with each other via the P2P interface without having to "hop" to any intermediate P2P nodes. For the P2P network topology 1000 shown in FIG. 10, there is no single point of failure and there are multiple reasonable floor arbitration candidates because each P2P device is within direct communication range of each other P2P device.

Figure 11A:
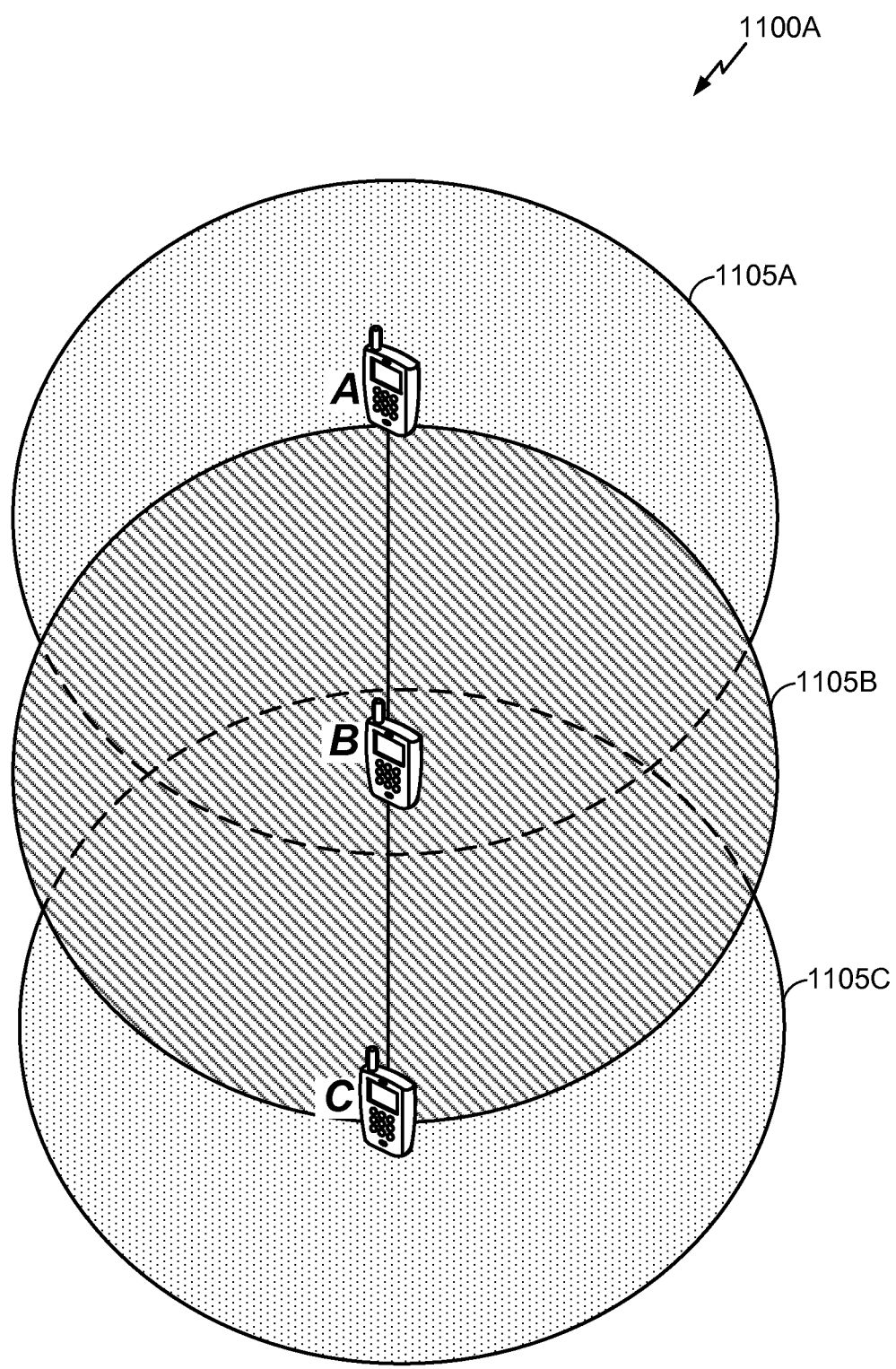
FIG. 11A illustrates another example of P2P network topology.

While the P2P network topology 1000 of FIG. 10 represents ideal conditions for P2P communication, other P2P network topologies do not necessarily support direct communication between all P2P group members. For example, FIG. 11A illustrates a P2P network topology 1100A, which may be referred to as a "star" topology because at least one node (i.e., UE B) can reach all other P2P devices, while other nodes (i.e., UEs A and C) cannot do so. In the P2P network topology 1100A, UEs A and B are positioned within each other's respective direct communication ranges 1105A and 1105B, respectively, and UEs B and C are also positioned within each other's respective direct communication ranges 1105B and 1105C, respectively. However, UEs A and C are not positioned within each other's respective direct communication ranges 1105A and 1105C, respectively. Accordingly, for UEs A and B to communicate with each other via the P2P interface, any traffic needs to "hop" to UE B as a mediating P2P node. As will be appreciated, the floor arbitrator selection schemes discussed above with respect to FIGS. 8-9 will not necessarily pick the most appropriate P2P device to be floor arbitrator for star network topologies, which in FIG. 10 is UE B.

Figure 11B:
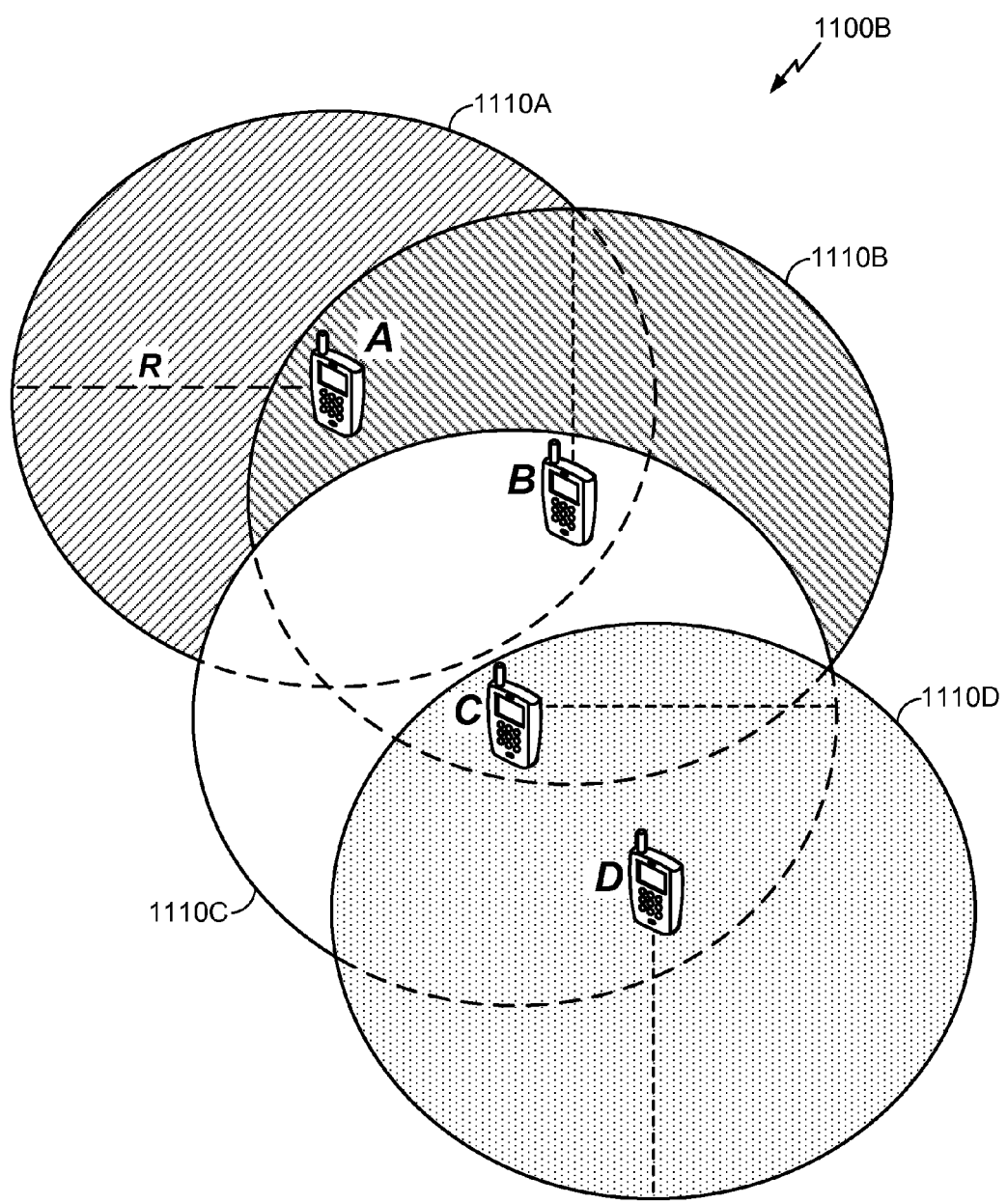
FIG. 11B illustrates another example of P2P network topology.

FIG. 11B illustrates another P2P network topology 1100B in accordance with an embodiment of the invention. In the P2P network topology 1100B, UEs A and B are positioned within each other's respective direct communication ranges 1110A and 1110B, respectively, UEs B and C are positioned within each other's respective direct communication ranges 1110B and 1110C, respectively, and UEs C and D are positioned within each other's respective direct communication ranges 1110C and 1110D, respectively. However, each of UEs A . . . D cannot directly communicate with at least one of the other UEs via the P2P interface, as shown in the reachability vector of Table 2 (below):

TABLE 2

Reachability Matrix for FIG. 11B

| | UE A | UE B | UE C | UE D |
|---|---|---|---|---|
| UE A | — | 1 | 0 | 0 |
| UE B | 1 | — | 1 | 0 |
| UE C | 0 | 1 | — | 1 |
| UE D | 0 | 0 | 1 | — |

In Table 2 (above), a "1" indicates two UEs that are in direct communication range of each other, a "0" indicates two UEs that are not in direct communication range of each other, and a dash or "-" is used when the UE in the column matches the UE in the row. As will be appreciated, the relatively complex network topology shown in FIG. 11B is suggestive that the floor arbitrator selection schemes discussed above with respect to FIGS. 8-9 will not necessarily pick the most appropriate P2P device to be floor arbitrator for the P2P network topology 1100B. Reachability matrices will be explained in more detail below with respect to FIGS. 12-15.

Figure 11C:
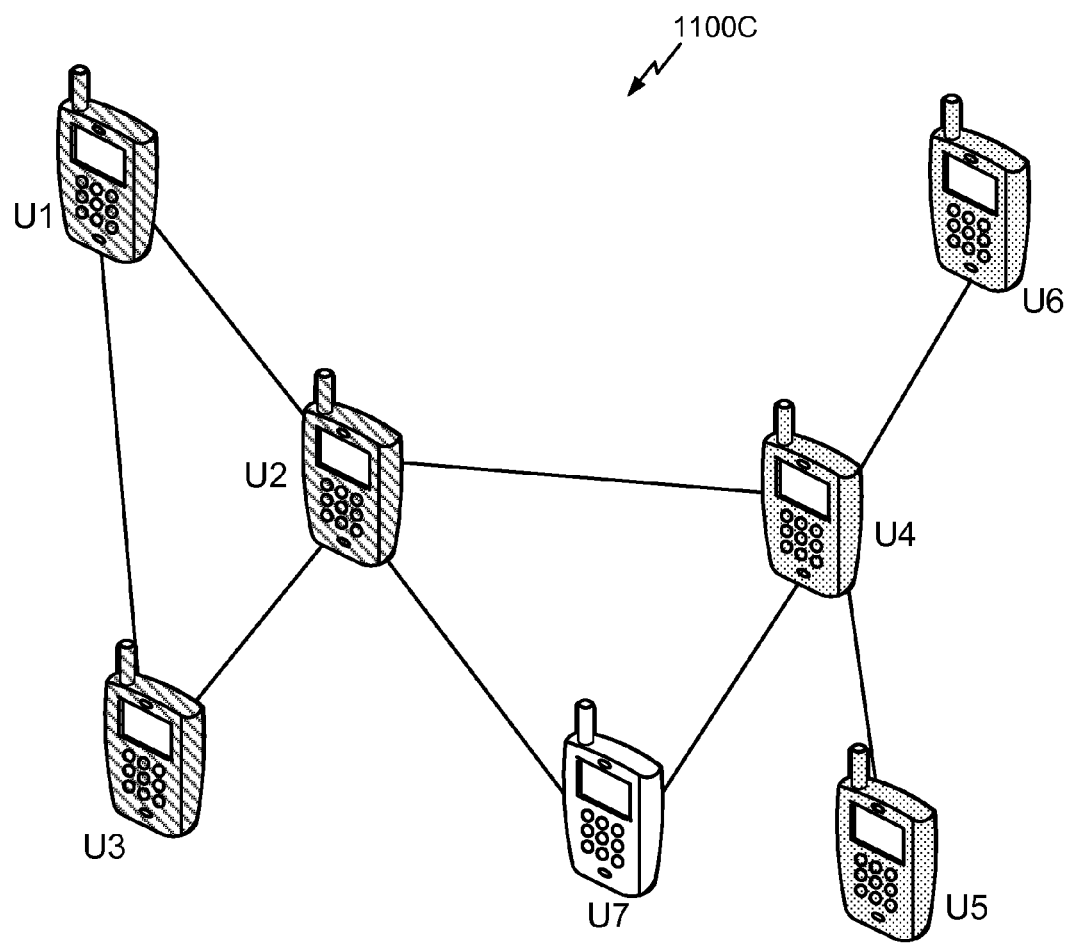
FIG. 11C illustrates another example of P2P network topology.

FIG. 11C illustrates another P2P network topology 1100C in accordance with an embodiment of the invention. In lieu of illustrating the actual direct communication ranges as in FIGS. 10-11B, FIG. 11C illustrates the direct connectivity between UEs U1 . . . U7 via line segments, which can be summarized via the reachability matrix of Table 3 (below):

TABLE 3

Reachability Matrix for FIG. 11C

|    | U1 | U2 | U3 | U4 | U5 | U6 | U7 |
|----|----|----|----|----|----|----|----|
| U1 | —  | 1  | 1  | 0  | 0  | 0  | 0  |
| U2 | 1  | —  | 1  | 1  | 0  | 0  | 1  |
| U3 | 1  | 1  | —  | 0  | 0  | 0  | 0  |
| U4 | 0  | 1  | 0  | —  | 1  | 1  | 1  |
| U5 | 0  | 0  | 0  | 1  | —  | 0  | 0  |
| U6 | 0  | 0  | 0  | 1  | 0  | —  | 0  |
| U7 | 0  | 1  | 0  | 1  | 0  | 0  | —  |

In Table 3 (above), a "1" indicates two UEs that are in direct communication range of each other, a "0" indicates two UEs that are not in direct communication range of each other, and a dash or "-" is used when the UE in the column matches the UE in the row. As will be appreciated, the relatively complex network topology shown in FIG. 11C is suggestive that the floor arbitrator selection schemes discussed above with respect to FIGS. 8-9 will not necessarily pick the most appropriate P2P device to be floor arbitrator for the P2P network topology 1100C. Reachability matrices will be explained in more detail below with respect to FIGS. 12-15.

Embodiments of the invention are directed to selecting a floor arbitration selection for a half-duplex group communication session based upon reachability vectors that are shared between two or more proximate P2P devices registered to a P2P group, as will be discussed below with respect to FIGS. 12-15. Moreover, as used herein, half-duplex group communication sessions encompass sessions where a single participant can access the floor at any given time, or sessions where multiple participants (but less than all participants) can access the floor at any given time. Half-duplex group communication sessions where multiple participants can transmit media (e.g., speech) to the P2P group while one or more other session participants can only receive media are sometimes referred to as hybrid-duplex group communication sessions. While embodiments described below primarily focus on single-floorholder half-duplex group communication sessions, it will be appreciated that these embodiments can alternatively be applied to a hybrid-duplex implementation. In a hybrid-duplex implementation, the floor arbitrator may receive unicast media feeds from the multiple floorholders and then perform a mixing operation to provide a mixed output frame for delivery to the P2P group, or alternatively the media feeds from the multiple floorholders can be multicasted to the P2P group for local mixing operations.

Figure 12:
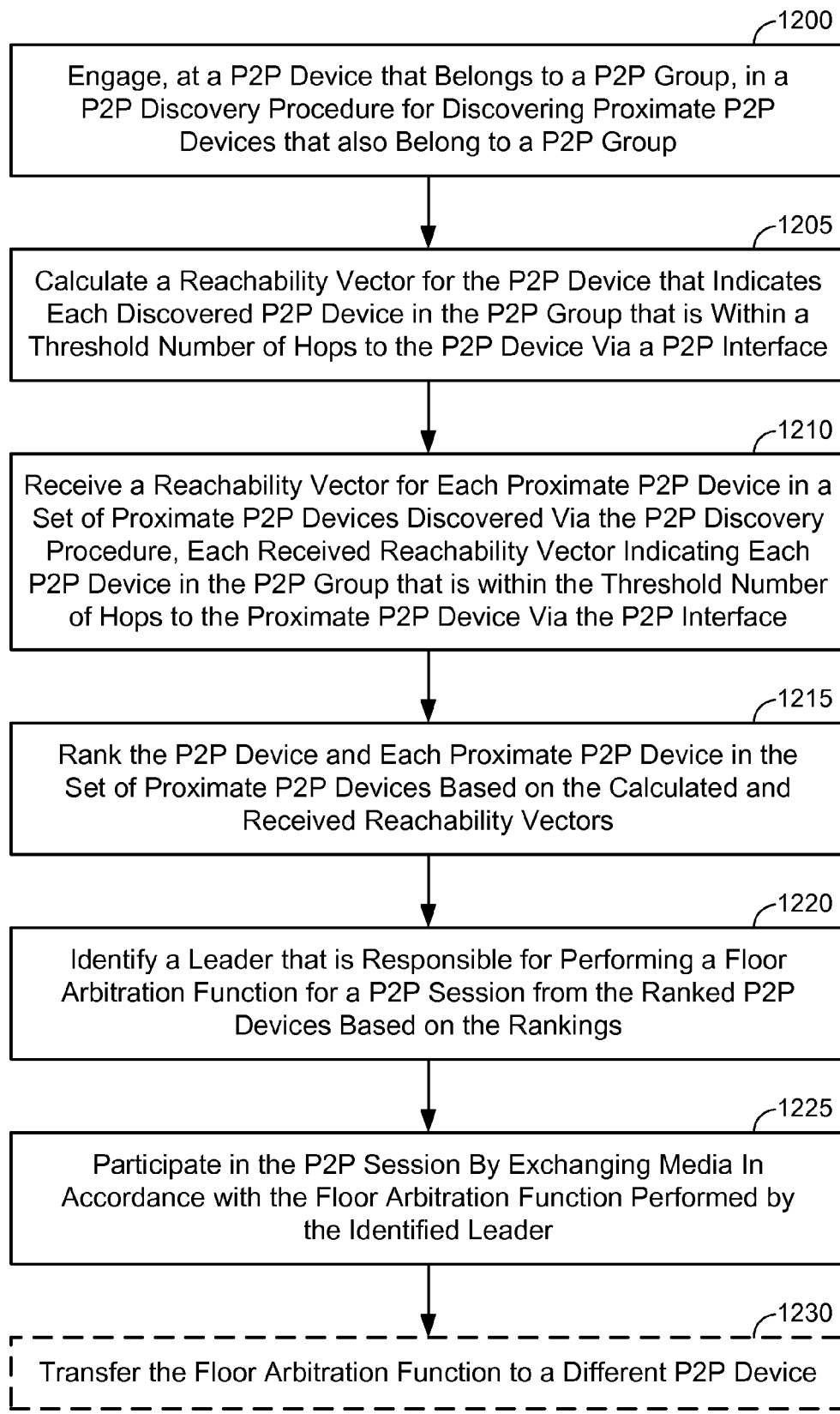
FIG. 12 illustrates a process of selecting a leader of a P2P group to perform a floor arbitration function for a half-duplex group communication session in accordance with an embodiment of the invention.

FIG. 12 illustrates a process of selecting a leader of a P2P group to perform a floor arbitration function for a half-duplex group communication session in accordance with an embodiment of the invention. Referring to FIG. 12, a P2P device that belongs to a P2P group engages in a P2P discovery procedure for discovering P2P devices that also belong to the P2P group, 1200. The P2P discovery procedure of 1200 generally includes an exchange of signaling messages over a P2P interface for the P2P group in order to determine the identities of each proximate P2P device in the P2P group relative to the P2P device. As used herein, a "proximate" P2P device includes P2P devices that are either in direct communication range of the P2P device, or alternatively P2P devices that can be reached via one or more "hops" to one or more other P2P devices.

Still referring to FIG. 12, the P2P discovery procedure of 1200 can be triggered in a variety of ways. For example, the P2P device can be triggered when the P2P device detects the presence of one or more proximate P2P devices that also belong to the P2P group. For example, the detection that triggers the P2P discovery procedure of 1200 can occur in response to the P2P device receiving an I_P2PDM from another P2P device that is also registered to the P2P group (e.g., based on the P2P device comparing an identifier from the I_P2PDM with a list of registered P2P devices for the P2P group to make the group association), or the P2P device receiving a G_P2PDM that identifies the P2P group, and so on. In a more specific LTE-D example, the P2P discovery procedure of 1200 can be triggered when a number of duplicate group Expressions exceeds a threshold.

In an alternative embodiment, the P2P discovery procedure of 1200 can be triggered "manually" (or user triggered) by one or more members of the P2P group. In an alternative embodiment, the P2P discovery procedure of 1200 can be triggered via external signaling (e.g., some other proximate P2P device makes the determination to perform P2P discovery for any of the above-noted reasons, and the P2P device simply complies with the externally triggered P2P discovery procedure). The P2P discovery procedure of 1200 can be triggered based on rules that are either user-specified or based on machine learning in other embodiments (e.g., entry of the P2P device into proximity of a particular location or area of interest, a measured environmental parameter such as time, ambient temperature, ambient brightness level, ambient noise level and/or ambient humidity level, or any combination thereof, such as at a particular shopping mall between 5-7 PM on Saturdays during the summer).

Referring to FIG. 12, after performing the initial P2P discovery procedure of 1200, the P2P device calculates a reachability vector that indicates each discovered P2P device in the P2P group that is within a threshold number of hops to the P2P device via the P2P interface, 1205. In an example, the threshold number of hops can be one, such that the reachability vector is calculated for P2P devices that are in direct communication range of the P2P device. However, the reachability vector could alternatively be multi-hop oriented (e.g., a vector of P2P devices that are within two (2) hops of the P2P device, and so on). Using the P2P network topology 1100C from FIG. 11C as an example, the reachability vectors for U1 is shown in Table 4 (below):

TABLE 4

Reachability Vector for U1 of FIG. 11C

|    | U1 | U2 | U3 | U4 | U5 | U6 | U7 |
|----|----|----|----|----|----|----|----|
| U1 | —  | 1  | 1  | 0  | 0  | 0  | 0  |

The reachability vector shown in Table 4 (above) is a simplified version whereby a "1" indicates two UEs that are in direct communication range of each other, a "0" indicates two UEs that are not in direct communication range of each other, and a dash or "-" is used when the UE in the column matches the UE in the row. However, a more generic framework or template for reachability vectors with an example of eight (8) total P2P devices is as follows:

TABLE 5

Example Reachability Vector Template

|    | U1 | U2       | U3       | U4       | U5       | U6       | U7       | U8       |
|----|----|----------|----------|----------|----------|----------|----------|----------|
| U1 | —  | $W_{12}$ | $W_{13}$ | $W_{14}$ | $W_{15}$ | $W_{16}$ | $W_{17}$ | $W_{18}$ |

In Table 5 (above), the value W that represents the reachability value between a source UE and a target UE, such that $W_{12}$ corresponds to the reachability value between U1 and U2, and so forth. Using Table 5, the reachability vector for U1 can be expressed as follows:

$$U1 = [-, W_{12}, W_{13}, W_{14}, W_{15}, W_{16}, W_{17}, W_{18}] \quad \text{Equation 1}$$

The reachability value can be calculated as follows:

$$W_{ij} = \alpha R_{ij} + Q_{ij}(1-\alpha) \quad \text{Equation 2}$$

whereby $R_{ij} = R_{ji} = 1$ if User I and User J can reach other, and whereby $Q_{ij}$ is a resource parameter that indicates a degree to which resources can be allocated by User I for an incoming request from User J. The value of Q can depend on several factors such as device type (e.g., smart phone, rugged, etc.), connectivity type (e.g., WiFi, WAN, etc.), operating system (OS) (e.g., Android, iOS, etc.), battery life and so on. Generally, lower values for Q denote low resource availability, while higher values for Q denote high resource availability. For example, $Q_{ij}$ can be equal to a non-binary numerical value that is the sum of parameters representative of phone type, connectivity, battery life, mobility (e.g., a high mobility characteristic may lower the value of Q because the given P2P device is expected to move away from the P2P group, whereas a low mobility characteristic may increase the value of Q because the given P2P device is expected to stay within P2P range, etc.), whether a location of the given P2P device is in proximity to a particular area of interest (e.g., if the given P2P device is near an area where the given P2P is typically plugged in for charging, $Q_{ij}$ may be weighted to increase the given P2P device's likelihood of becoming leader and vice versa, if the given P2P device is operated by a supervisory user of a particular area such as a teacher at school, $Q_{ij}$ may be weighted to increase the given P2P device's likelihood of becoming leader, if the given P2P device is operated by a subordinate user of a particular area such as a student at school, Qij may be weighted to decrease the given P2P device's likelihood of becoming leader, and so on) expected time-to-live (TTL) in the environment (e.g., an expected time a given P2P device is expected to stay connected to the P2P group via the P2P interface, which can be based on the mobility of the given P2P device), relay support (e.g., a capacity to act as a relay for forwarding media and/or signaling), or any combination thereof, and whereby $\alpha$ is a scaling factor whereby $\alpha \to 1$ denotes higher preference towards reachability whereas $\alpha \to 0$ denotes higher preference towards resource availability. Accordingly, the reachability vector shown in Table 4 (above) can be calculated using Equations 1-2, in an example.

Referring to FIG. 12, after 1205, the P2P device knows its own reachability vector, but does not yet know the reachability vectors of the other proximate P2P devices and thereby has limited visibility regarding P2P devices that are more than the threshold number of hops away from the P2P device. The P2P device thereby receives a reachability vector for each proximate P2P device in a set of proximate P2P devices discovered via the P2P discovery procedure, each received reachability vector indicating each P2P device in the P2P group that is within the threshold number of hops to the proximate P2P device via the P2P interface, 1210. The set of proximate P2P devices can correspond to the P2P devices in direct communication range with the P2P device (e.g., single-hop, as shown in the example related to FIG. 13 and Tables 9-10 below) or can correspond to each proximate P2P device in the P2P group (e.g., reachable via single-hop or multi-hop, as shown in the example related to Table 8 below). In an example, the reachability vector(s) that are received at 1210 can be received over the P2P interface of the P2P group. While not shown explicitly in FIG. 12, the P2P device can also transmit its own calculated reachability vector that was calculated at 1205 to each proximate P2P device in the set of proximate P2P devices, either via single-hop or multi-hop.

The P2P device ranks both itself and the proximate P2P devices from the set of proximate P2P devices based on a combination of the calculated reachability vector from 1205 and the received reachability vector(s) from 1210, 1215. The P2P device can use the calculated reachability vector from 1205 and the received reachability vector(s) from 1210 to construct a "reachability matrix" that includes the respective reachability vectors along with a leader score for each vector, whereby the leader scores are used to determine the rankings. Examples of how the P2P device can rank the respective P2P devices will now be discussed.

In a single-hop network topology example of the ranking that occurs at 1215, a reachability matrix along with the associated leader scores for the P2P network topology 1000 of FIG. 10 may be as follows, with the assumption that $\alpha=1$, such that the resource parameter Q has no impact on Equation 1:

TABLE 6

Reachability Matrix for FIG. 10 Where $\alpha = 1$

| | UE A | UE B | UE C | UE D | Leader Score (Sum) |
|---|---|---|---|---|---|
| UE A | — | 1 | 1 | 1 | 3 |
| UE B | 1 | — | 1 | 1 | 3 |
| UE C | 1 | 1 | — | 1 | 3 |
| UE D | 1 | 1 | 1 | — | 3 |

Because UEs A . . . D are each in direct communication (or a single hop away from each other), the leader scores for UEs A . . . D are the same when $\alpha=1$. Next, consider the scenario where $\alpha=0$, and further assume that UEs C-D have strong connectivity and high battery power, whereas UEs A-B are very weak on battery level. This means that it is more appropriate for UE C or UE D to be the leader in this scenario, and the reachability matrix in this scenario can be expressed as follows:

TABLE 7

Reachability Matrix for FIG. 10 Where $\alpha = 0$ and UEs C-D

| | UE A | UE B | UE C | UE D | Leader Score (Sum) |
|---|---|---|---|---|---|
| UE A | — | 0.5 | 0.5 | 0.5 | 1.5 |
| UE B | 0 | — | 0 | 0 | 0 |
| UE C | 3 | 3 | — | 3 | 9 |
| UE D | 3 | 3 | 3 | — | 9 |

From Table 7 (above), UEs A and B have very low leader scores and are not considered for leadership of the P2P group. However, UEs C and D are tied for leadership. When this occurs, a tie-breaking procedure can be executed to select between UEs C and D to be the leader of the P2P group. In an example, the tie-breaking procedure can include UEs C or D generating a random number and sending the random number to the other UE which generates its own random number for comparison, with the UE that generates the highest random number being the leader. After a leader is selected, the rest of the P2P group is notified of the leader selection or identification, 1220. For example, a leader confirmation message can be sent out to each proximate P2P member in the P2P group so that there is no leader confusion. Also, the selected leader can further convey a list of "backup" leaders in case the selected leader loses its capacity to be leader (e.g., moves out of range, etc.). So, using Table 7 as an example, if UE C is the selected leader, UE C can notify the P2P group that UE D is the back-up leader. As will be appreciated, the UE that performs the leader selection identifies the leader as soon as the selection is made at 1220, whereas the other UEs identify the leader at 1220 once they receive the leader confirmation message.

In a multi-hop network topology example of the ranking that occurs at 1215, a reachability matrix along with the associated leader scores for the P2P network topology 1100C of FIG. 11C may be as follows, with the assumption that $\alpha=1$, such that the resource parameter Q has no impact on Equation 1:

TABLE 8

Reachability Matrix for FIG. 11C Where $\alpha = 1$

|    | U1 | U2 | U3 | U4 | U5 | U6 | U7 | Leader Score (Sum) |
|----|----|----|----|----|----|----|----|---------------------|
| U1 | —  | 1  | 1  | 0  | 0  | 0  | 0  | 2 |
| U2 | 1  | —  | 1  | 1  | 0  | 0  | 1  | 4 |
| U3 | 1  | 1  | —  | 0  | 0  | 0  | 0  | 2 |
| U4 | 0  | 1  | 0  | —  | 1  | 1  | 1  | 4 |
| U5 | 0  | 0  | 0  | 1  | —  | 0  | 0  | 1 |
| U6 | 0  | 0  | 0  | 1  | 0  | —  | 0  | 1 |
| U7 | 0  | 1  | 0  | 1  | 0  | 0  | —  | 2 |

From Table 8 (above), UEs U2 and U4 have the highest leader scores. Accordingly, a tie-breaking procedure can be executed to select between UEs U2 and U4 to be the leader of the P2P group. In an example, the tie-breaking procedure can include UEs U2 or U4 generating a random number and sending the random number to the other UE which generates its own random number for comparison, with the UE that generates the highest random number being the leader. In another example, while not shown expressly in Table 8, the P2P device can also factor the number of "exclusions", i.e., the number of P2P devices that UEs with the highest leader score cannot directly communicate. In FIG. 11C, U2 has two exclusions (i.e., U5 and U6) and U4 also has two exclusions (i.e., U1 and U3), so the exclusion number would not be used as the tie-breaker in this particular example because the two numbers are the same, but in other embodiments the exclusion number can be used as part of the tie-breaking procedure (e.g., the selected leader is the leader with the lowest exclusion number from among the UEs with the highest leader scores).

In another multi-hop network topology example of the ranking that occurs at 1215, the reachability matrices constructed by each P2P device only include the reachability vectors for the P2P devices that are in direct communication range. Using the example P2P network topology 1100C of FIG. 11C as an example, the reachability matrices for would be as follows in this scenario where $\alpha=1$:

TABLE 9

U2's Reachability Matrix for FIG. 11C Where $\alpha = 1$

|    | U2 | U4 | U5 | U6 | U7 | Leader Score (Sum) | Exclusion from Self | Exclusion from Leader |
|----|----|----|----|----|----|---------------------|---------------------|------------------------|
| U1 | —  | 1  | 1  | 0  | 0  | 2 | | |
| U2 | 1  | —  | 1  | 1  | 1  | 4 | | 2 |
| U3 | 1  | 1  | —  | 0  | 0  | 2 | | |

TABLE 9-continued

U2's Reachability Matrix for FIG. 11C Where $\alpha = 1$

|    | U2 | U4 | U5 | U6 | U7 | Leader Score (Sum) | Exclusion from Self | Exclusion from Leader |
|----|----|----|----|----|----|---------------------|---------------------|------------------------|
| U4 | 0  | 1  | 0  | —  | 1  | 4 | 2 | |
| U7 | 0  | 1  | 0  | 1  | —  | 2 | | |

TABLE 10

U4's Reachability Matrix for FIG. 11C Where $\alpha = 1$

|    | U1 | U2 | U3 | U4 | U7 | Leader Score (Sum) | Exclusion from Self | Exclusion from Leader |
|----|----|----|----|----|----|---------------------|---------------------|------------------------|
| U2 | —  | 1  | 0  | 0  | 1  | 4 | 2 | |
| U4 | 1  | —  | 1  | 1  | 1  | 4 | | 2 |
| U5 | 0  | 1  | —  | 0  | 0  | 1 | | |
| U6 | 0  | 1  | 0  | —  | 0  | 1 | | |
| U7 | 1  | 1  | 0  | 0  | —  | 2 | | |

Figure 13:
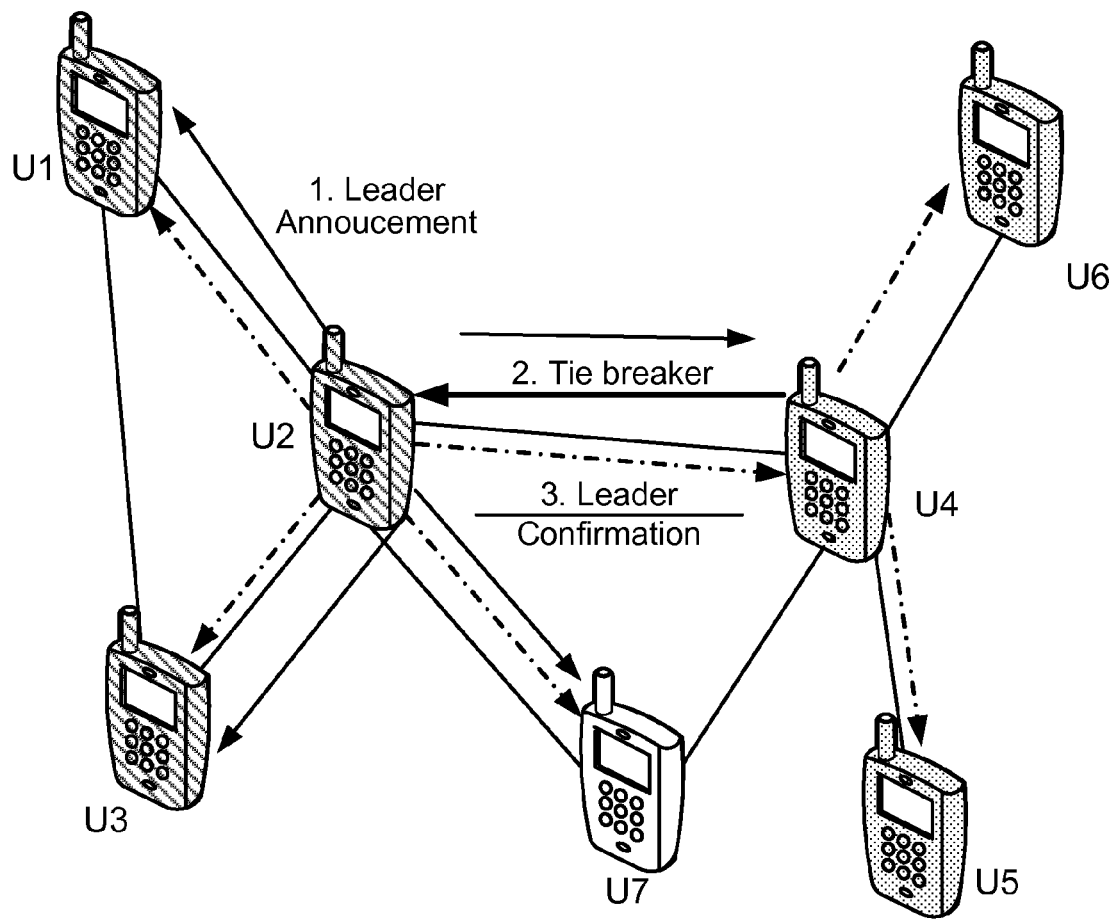
FIG. 13 illustrates the P2P network topology of FIG. 11C with additional messaging being exchanged in accordance with an embodiment of the invention.

From Tables 9-10 (above), U2 lacks the reachability vectors for U5 and U6, whereas U4 lacks the reachability vectors for U1 and U3. U2 has two exclusions from self (U5 and U6), and U4 also has two exclusions from self (U1 and U3). So, U2 would have two exclusions if selected as the leader, and U4 would also have two exclusions if selected as the leader. Assume that U2 decides to try to be the leader, and sends out a leader announcement (1) as shown in FIG. 13, which illustrates the P2P network topology 1100C from FIG. 11C with additional messaging. U4 receives the leader confirmation but decides that it also wants to be the leader, and thereby triggers the tie-breaking procedure (2) (e.g., generate and send a random number to U2, etc.). U2 then executes the tie-breaking procedure (e.g., by generating its own random number and comparing the random number to U4's random number and picking the UE with the higher number as the leader, etc.), after which U2 sends a lead confirmation message (3) to the P2P group to announce the selected leader (U2 or U4). In this case, whichever UE (U2 or U4) is not selected as the leader may act as a relay point for P2P group communication. For example, if U4 is selected as the leader, U4 may transmit to U2 and U5-U6, with U2 re-transmitting (via multicast or unicast) any of U4's transmissions that are directed to U1 or U3, or alternatively U1 or U3 may transmit to U2, with U2 re-transmitting (via multicast or unicast) any of U1 or U3's transmissions directed to any of U4-U7.

After a leader is selected, the rest of the P2P group is notified of the leader selection or identification, 1220. For example, a leader confirmation message can be sent out to each proximate P2P member in the P2P group so that there is no leader confusion. Also, the selected leader can further convey a list of "backup" leaders in case the selected leader loses its capacity to be leader (e.g., moves out of range, etc.). So, using Table 8 as an example, if U2 is the selected leader, U2 can notify the P2P group that U4 is the back-up leader. As will be appreciated, the UE that performs the leader selection identifies the leader as soon as the selection is made at 1220, whereas the other UEs identify the leader at 1220 once they receive the leader confirmation message.

The purpose of the leader selection of 1220 is specifically to identify the P2P device that will be responsible (at least initially) for performing a floor arbitration function for a half-duplex group communication session via P2P. However, the selected leader can also optionally act as a media relay to accommodate multi-hop network topologies. Accordingly, at some point after the leader is selected at 1220 (which can be delayed somewhat, as the floor arbitrator or leader can potentially be identified before any P2P device actually wants to originate a P2P session), the P2P device participates in the P2P session by exchanging media with one or more other P2P devices from the set of proximate P2P devices in accordance with the floor arbitration function performed by the identified leader (would could potentially be the P2P device itself, or alternatively one of the other P2P devices), 1225. Optionally, the floor arbitration function may be transferred from the selected leader to a different P2P device at some point during the P2P session, 1230. For example, the process of FIG. 12 may periodically repeat during the P2P session to ensure that the selected leader is still appropriate to handle the floor arbitration function. In another example, the selected leader may move out of range and drop out of the P2P session altogether, which necessitates a new leader to be selected. For example, the selected leader may transmit a "heartbeat" (i.e., a periodic keep-alive message), and the process of FIG. 12 can be triggered to select a new leader whenever the heartbeat gets too weak or simply stops altogether. In an example, the heartbeat can be transmitted exclusively by the current floor arbitrator, or by a subset of nodes in the P2P group (e.g., the floor arbitrator plus one or more proxy nodes, such as floor arbitrator back-ups).

Figure 14:
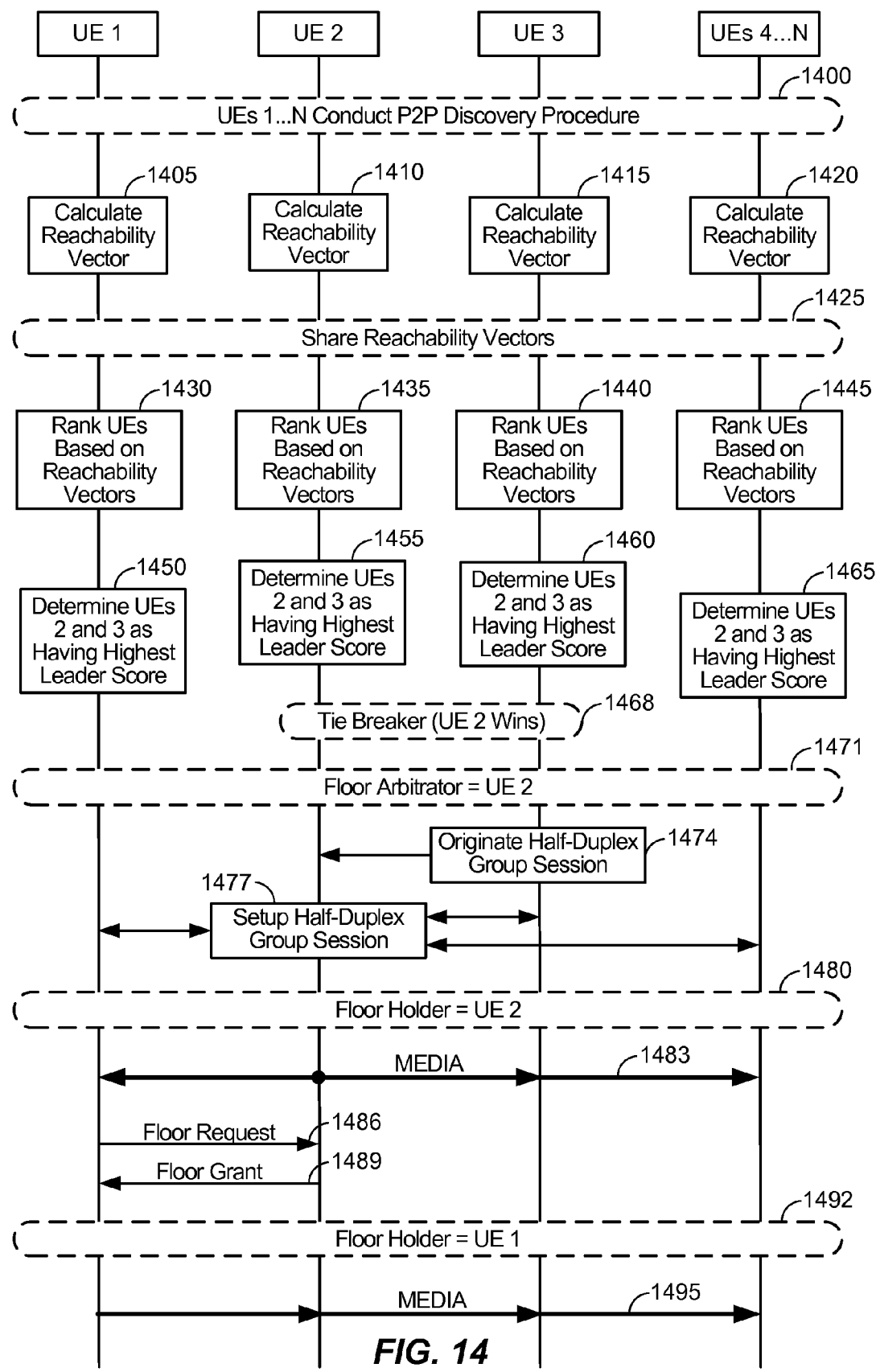
FIG. 14 illustrates an example implementation of the process of FIG. 12 in accordance with an embodiment of the invention.

FIG. 14 illustrates an example implementation of the process of FIG. 12 in accordance with an embodiment of the invention.

Referring to FIG. 14, assume that UEs 1 . . . N belong to (or are registered to) a P2P group, and that UEs 1 . . . N engage in a P2P discovery procedure so as to identify proximate P2P group members of the P2P group, 1400 (e.g., similar to 1200 of FIG. 12). As discussed above with respect to 1200, the P2P discovery procedure of 1400 can be triggered in a variety of ways (e.g., detection by at least one of UEs 1 . . . N that a threshold number, or quorum, of P2P group members is present based upon receive of one or more I_P2PDMs or G_P2PGMs, in response to user input to trigger the P2P discovery procedure, in response to an event-based trigger such as time and/or location, in response to environmental condition(s), in response to a signal from an external device, etc.).

After performing the P2P discovery procedure of 1400, UEs 1 . . . N each calculate a reachability vector, 1405, 1410, 1415, 1420 (e.g., as in 1205 of FIG. 12). UEs 1 . . . N then share the calculated reachability vectors with each other, 1425 (e.g., as in 1210 of FIG. 12). As will be appreciated, in a multi-hop network topology, some of the calculated reachability vectors will need to be relayed or forwarded by at least one intermediate UE to be shared with each of the UEs in the P2P group at 1425. UEs 1 and 3 . . . N next rank the UEs from which reachability vectors are received based upon their own calculated reachability vectors from 1405-1420 in combination with the received reachability vectors from the other UEs at 1425, 1430, 1435, 1440 and 1445. Assume that UEs 1 . . . N each determine that UEs 2 and 3 have the highest leader score, 1450, 1455, 1460, 1465, after which UEs 2 and 3 engage in a tie-breaker procedure with UE 2 wins, 1468. UE 2 thereby becomes the selected leader, and the P2P group is notified that UE 2 will be performing the floor arbitration function as the selected leader via a leader confirmation message, 1471 (e.g., as in 1220 of FIG. 12).

At some later point in time, UE 3 sends a unicast message to UE 2 to request origination of a half-duplex group communication session (or P2P session) with the P2P group, 1474. UE 2 sets up the P2P session in response to the request, 1477, which establishes UE 2 as the initial floorholder for the P2P session, 1480. Once UE 2 is established as the floorholder in 1480, UE 2 begins to stream (or multicast) media to the P2P group, 1483. Based on the P2P network topology, the media can be streamed at 1483 either in a direct manner from UE 1 to the other P2P session participants, or via a hopping relay whereby UE 1 transmits the media to the current floor arbitrator (i.e., UE 2) which in turn re-transmits UE 1's media to other UEs in the P2P session via multicast. At some later point during the P2P session, UE 1 sends a floor request message (via unicast) to UE 2, 1486, and UE 2 sends a floor grant message to UE 1 (via unicast), 1489. At this point, UE 1 is established as the new floorholder for the P2P session and the rest of the participating P2P devices are notified of the new floorholder, 1492. Once UE 1 is established as the floorholder in 1492, UE 1 begins to stream (or multicast) media to the P2P group (e.g., via direct transmission or multi-hop relay), 1495.

Figure 15A:
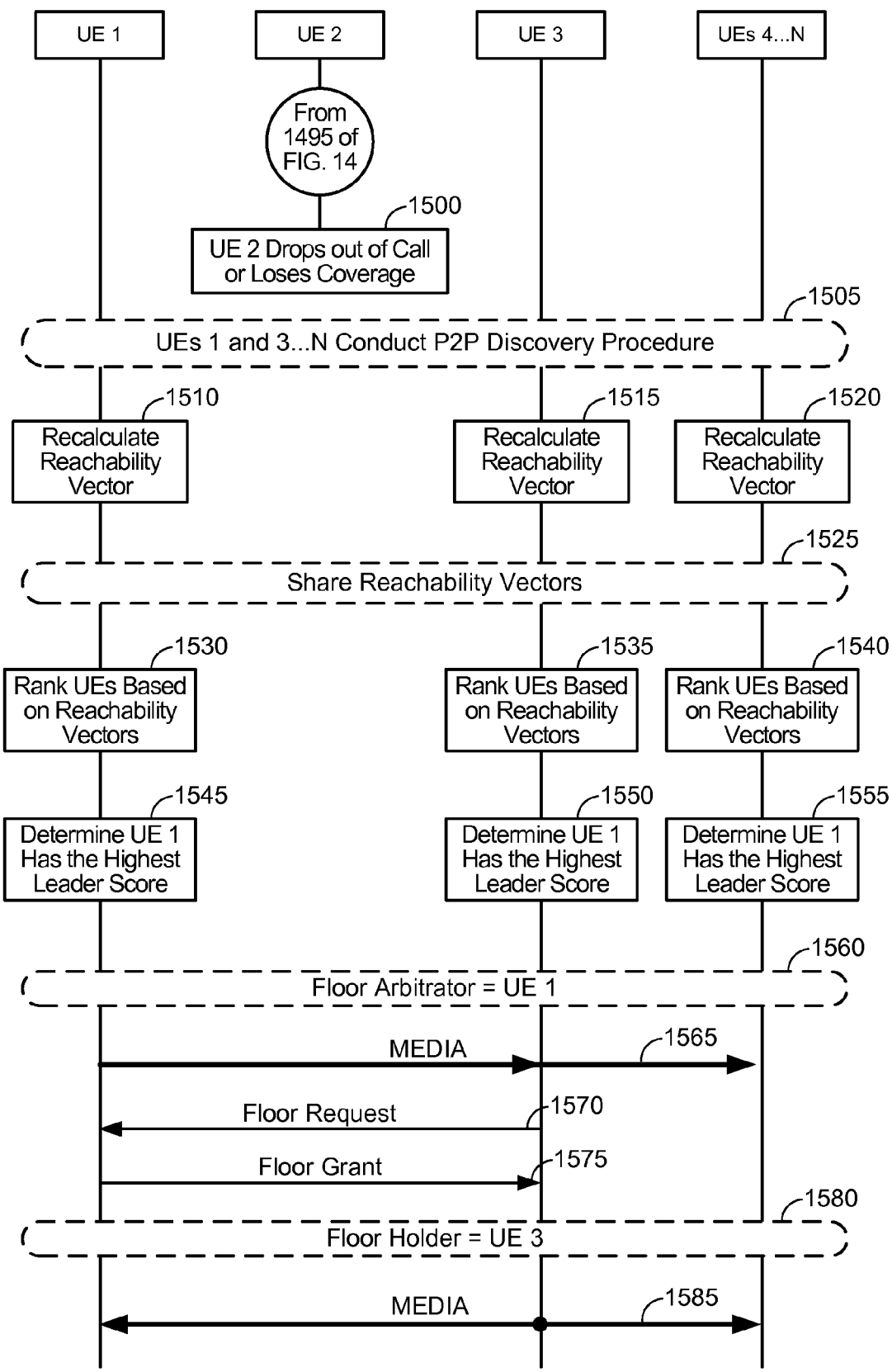
FIG. 15A illustrates a continuation of the process of FIG. 14 in accordance with an embodiment of the invention.

FIG. 15A illustrates a continuation of the process of FIG. 14 in accordance with an embodiment of the invention.

Referring to FIG. 15A, at some later point in the P2P session while media is being streamed (or multicasted) from UE 1 to the rest of the P2P group (e.g., via direct transmission or multi-hop relay), the current floor arbitrator (i.e., UE 2) drops out of the P2P session or moves out of range of the rest of the P2P group and can no longer perform the floor arbitration function for the P2P session, 1500. Of course, in other examples, a different trigger could occur to prompt a new floor arbitrator to be selected (e.g., a manual selection by one or more priority users, an environmental status change or location change, a battery level of UE 2 dropping too low, a change to the P2P network topology, etc.). UE 2 dropping out of the P2P session functions to trigger UEs 1 and 3 . . . N to perform the P2P discovery procedure again, 1505 (e.g., similar to 1400 of FIG. 14). For example, one or more of UEs 1 and 3 . . . N may detect that a threshold period of time has elapsed since the last heartbeat (or periodic keep-alive packet) from UE 2 has been received, from which the one or more UEs infer that UE 2 has dropped out of the P2P session for some reason.

UEs 1 and 3 . . . N recalculate their respective reachability vectors, 1510, 1515 and 1520 (e.g., similar to 1430, 1440 and 1445 of FIG. 14) and then share their reachability vectors with each other, 1525 (e.g., similar to 1425 of FIG. 14). UEs 1 and 3 . . . N next rank themselves along with the UEs from which reachability vectors are received based on the received reachability vectors, 1530, 1535 and 1540 (e.g., similar to 1430, 1440 and 1445 of FIG. 14). Assume that UEs 1 and 3 . . . N each determine that UE 1 has the highest leader score, 1545, 1550 and 1555, after which UE 1 is confirmed as the leader via a leader confirmation message, 1560 (e.g., similar to 1471 of FIG. 14).

At this point, UE 1 continues to stream (or multicast) media to the P2P group (e.g., via direct transmission or multi-hop relay), 1565, in addition to taking over responsibility for performing the floor arbitration function. At some later point during the P2P session, UE 3 sends a floor request message (via unicast) to UE 1, 1570, and UE 1 sends a floor grant message to UE 3 (via unicast), 1575. At this point, UE 3 is established as the new floorholder for the P2P session and the rest of the participating P2P devices are notified of the new floorholder, 1580. Once UE 3 is established as the floorholder in 1580, UE 3 begins to stream (or multicast) media to the P2P group (e.g., via direct transmission or multi-hop relay), 1585.

While not shown explicitly in FIG. 15A, if UE 2 is able to re-establish its connection to the P2P session, UE 2 may resume its role as floor arbitrator for the P2P session (e.g., either automatically if occurring within a threshold period of time from the dropout of 1500, or by virtue of re-triggering the process of FIG. 12).

Figure 15B:
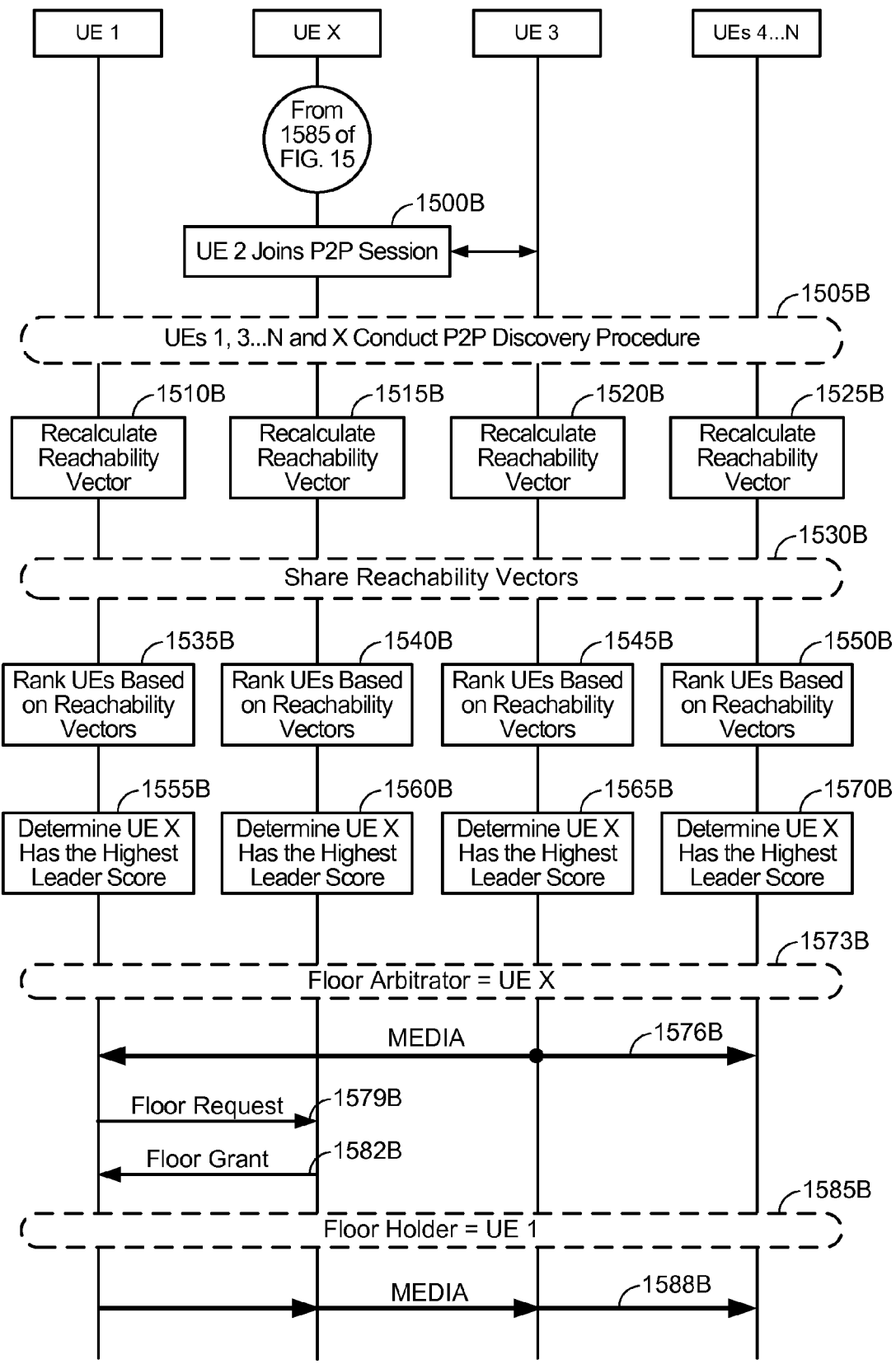
FIG. 15B illustrates a continuation of the process of FIG. 15A in accordance with an embodiment of the invention.

FIG. 15B illustrates a continuation of the process of FIG. 15A in accordance with an embodiment of the invention.

Referring to FIG. 15B, at some later point in the P2P session while media is being streamed (or multicasted) from UE 3 to the rest of the P2P group (e.g., via direct transmission or multi-hop relay), a new UE (i.e., UE X) joins the P2P session, 1500B. UE X joining the P2P session functions to trigger UEs 1, 3 . . . N and X to perform the P2P discovery procedure again, 1505B. UEs 1 and 3 . . . N recalculate their respective reachability vectors and UE X calculates its reachability vector, 1510B, 1515B, 1520B and 1525B, and then UEs 1, 3 . . . N and X share their reachability vectors with each other, 1530B. UEs 1, 3 . . . N and X next rank themselves along with the UEs from which reachability vectors are received based on the received reachability vectors along with their own calculated reachability vectors, 1535B, 1540B, 1545B and 1550B. Assume that UEs 1, 3 . . . N and X each determine that UE X has the highest leader score, 1555B, 1560B, 1565B and 1570B, after which UE X is confirmed as the leader via a leader confirmation message, 1573B.

At this point, UE 3 continues to stream (or multicast) media to the P2P group (e.g., via direct transmission or relay through UE X), 1576B, while UE X takes over responsibility for performing the floor arbitration function. At some later point during the P2P session, UE 1 sends a floor request message (via unicast) to UE X, 1579B, and UE X sends a floor grant message to UE 1 (via unicast), 1582B. At this point, UE 1 is established as the new floorholder for the P2P session and the rest of the participating P2P devices are notified of the new floorholder, 1585B. Once UE 1 is established as the floorholder in 1585B, UE 1 begins to stream (or multicast) media to the P2P group (e.g., via direct transmission or multi-hop relay), 1588B.

While not illustrated explicitly, for multi-hop network topologies, it is possible that multiple leaders could be selected. Using the P2P network topology 1100C from FIG. 11C as an example, both U2 and U4 could be selected as leaders that coordinate with each other to control the overall P2P group. In this case, the floor arbitration function can be performed in parallel (e.g., both U2 and U4 have the power to grant the floor, revoke the floor, etc.), or alternatively there can be one "master" leader and one "slave" leader with the master leader performing the actual floor arbitration function and the slave leader performing a relay or forwarding function. For example, if U2 is the master leader, U6 may send a floor request to U4 under the assumption that U4 is the leader, while U4 forwards the floor request to U2 instead of directly making any floor arbitration decisions itself. In this case, for the sake of efficiency, U7 would send its own floor request messages directly to U2 to avoid the necessity for U4 to forward U7's signaling messages to U2. The same type of rules could also be used for media forwarding in a master/slave leader configuration. Also, for larger multi-hop network topologies with more hops, there could be additional slave leaders and potentially additional master leaders as well.

P2P discovery occurs over a defined P2P discovery channel of the P2P interface, after which signaling and media for P2P sessions occur via unicast or multicast. A unicast P2P message is sent from one P2P node to one target P2P node, whereas a multicast P2P message can be received by multiple target P2P nodes. For example, in the process of FIG. 8, the P2P discovery procedure of 800 occurs over the P2P discovery channel, the media of 820, 840 or 865 is shared over a multicast media channel or (in part) a unicast media channel (e.g., media can be sent to a relay point via unicast and then multicasted from the relay), while any signaling after the P2P discovery procedure (e.g., 805, 810, 815, 825, 830, 835, 845, 850, 855, 860, 875 and 880 of FIG. 8) occurs via unicast.

Figure 16:
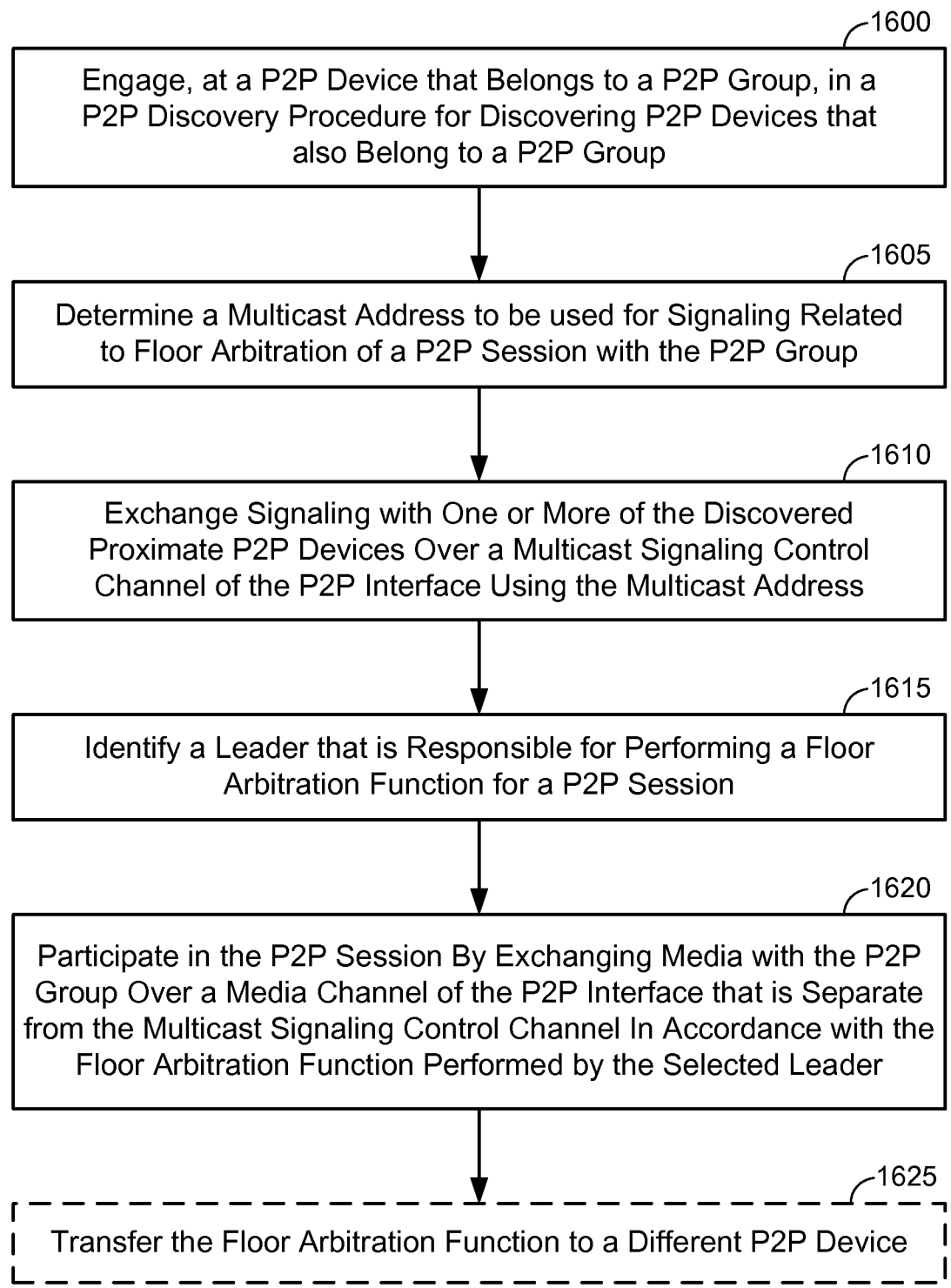
FIG. 16 is directed to a process of establishing a multicast signaling control channel to be used for signaling related to floor arbitration of a P2P session in accordance with an embodiment of the invention.

FIG. 16 is directed to a process of establishing a multicast signaling control channel to be used for signaling related to floor arbitration of a P2P session in accordance with an embodiment of the invention. Referring to FIG. 16, a P2P device that belongs to (or is registered to) a P2P group engages in a P2P discovery procedure for discovering P2P devices that also belong to the P2P group, 1600. The P2P discovery procedure of 1600 generally includes an exchange of signaling messages over a P2P interface for the P2P group in order to determine the identities of each proximate P2P device in the P2P group relative to the P2P device. As used herein, a "proximate" P2P device includes P2P devices that are either in direct communication range of the P2P device, or alternatively P2P devices that can be reached via one or more "hops" to one or more other P2P devices.

Referring to FIG. 16, the P2P device determine a multicast address to be used for signaling related to floor arbitration of a P2P session with the P2P group, 1605. The multicast address can be determined in a variety of ways, as will now be explained.

In a first example, the multicast address can be pre-assigned or pre-provisioned at each P2P device registered to the P2P group. For example, each P2P device can be required to registered to the P2P group with an external device (e.g., an external server), and the external server can provision the P2P devices with the pre-assigned multicast address during registration. In another example, the external server can send the multicast address to the P2P devices registered to the P2P group at some point after registration.

In a second example specific to LTE-D, the multicast address can be derived as an IPv6 address from an Expression associated with the P2P group. An example IPv6 multicast address format is as follows:

TABLE 11

Example IPv6 Multicast Address Format

| Bit | Field |
|---|---|
| 8 | Prefix |
| 4 | Flags |
| 4 | Scope |
| 112 | Group ID |

The 4-bit "Flags" field is defined by IPv6 as follows:

TABLE 12

Example IPv6 Flags Field

| Bit | Flag | 0 | 1 |
|---|---|---|---|
| 0 (MSB) | (Reserved) | (Reserved) | (Reserved) |
| 1 | R (Rendezvous) | Rendezvous Point Not Embedded | Rendezvous Point Embedded |
| 2 | P (Prefix) | Without Prefix Information | Address Based on Network Prefix |

TABLE 12-continued

Example IPv6 Flags Field

| Bit | Flag | 0 | 1 |
|---|---|---|---|
| 3 (LSB) | T (Transient) | Well-known Multicast Address | Dynamically Assigned Multicast Address |

The IPv6 prefix shown in Table 11 (above) can be defined based on operator policy for link local addresses for P2P service. The Flags field shown in Table 11 and again in Table 12 in more detail can be set to indicate the Transient flag to show a dynamically assigned multicast address. The scope field shown in Table 11 (above) can be set to link local, or organization local or site local depending on operator and service policy which can be predetermined (e.g., known to each P2P device in the P2P group, which permits independent derivation of the IPv6 multicast address). The remainder of the IPv6 multicast address can then incorporate bits from the Group ID 715B using a hash function, as described below in more detail.

Referring back to FIG. 7B, the unique Group ID 715B for the P2P group is known to each P2P device registered to the P2P group, and can thereby be used for independent derivation of the multicast address to be used for signaling in an example. In particular, to construct the 112-bit Group ID field for the multicast address using IPv6 as shown in Table 11 (above), the Group ID 715B can be hashed along with an application-specific string (e.g., which can be provisioned with a client application that supports P2P sessions on each of the registered P2P devices, such as a PTT-specific string, and so on) to produce the 112-bit Group ID field for the IPv6 multicast address using any suitable hashing algorithm. In an example hashing algorithm for computing the IPv6 multicast address, the 112 least significant bits (LSBs) from the output of the SHA-256 hashing function with input as Group ID 715B along with and application-specific string can be combined so as to produce the IPv6 multicast address. However, it will be appreciated that this is a mere example and any suitable hashing algorithm can be used to combine the Group ID 715B with the application-specific string, potentially based on other parameters as well if the other parameters are available at each P2P group member. As will be appreciated, a defined multicast address derivation rule combined with information (e.g., the Group ID 715B) available to each registered P2P device permits the multicast address to be independently derived at each registered P2P device without any coordination or signaling during discovery or session setup (although the capability of independent derivation does not imply that such coordination or signaling is actually prohibited during discovery and/or session setup).

In a further example, the multicast address determined at 1605 can either be determined during or after the P2P discovery procedure from 1600, or can alternatively occur at some earlier point in time and then stored locally at the P2P device. Thus, the determination of 1605 can either be a mathematical derivation operation, or alternatively an operation of loading a stored multicast address from memory at the P2P device.

Figure 17:
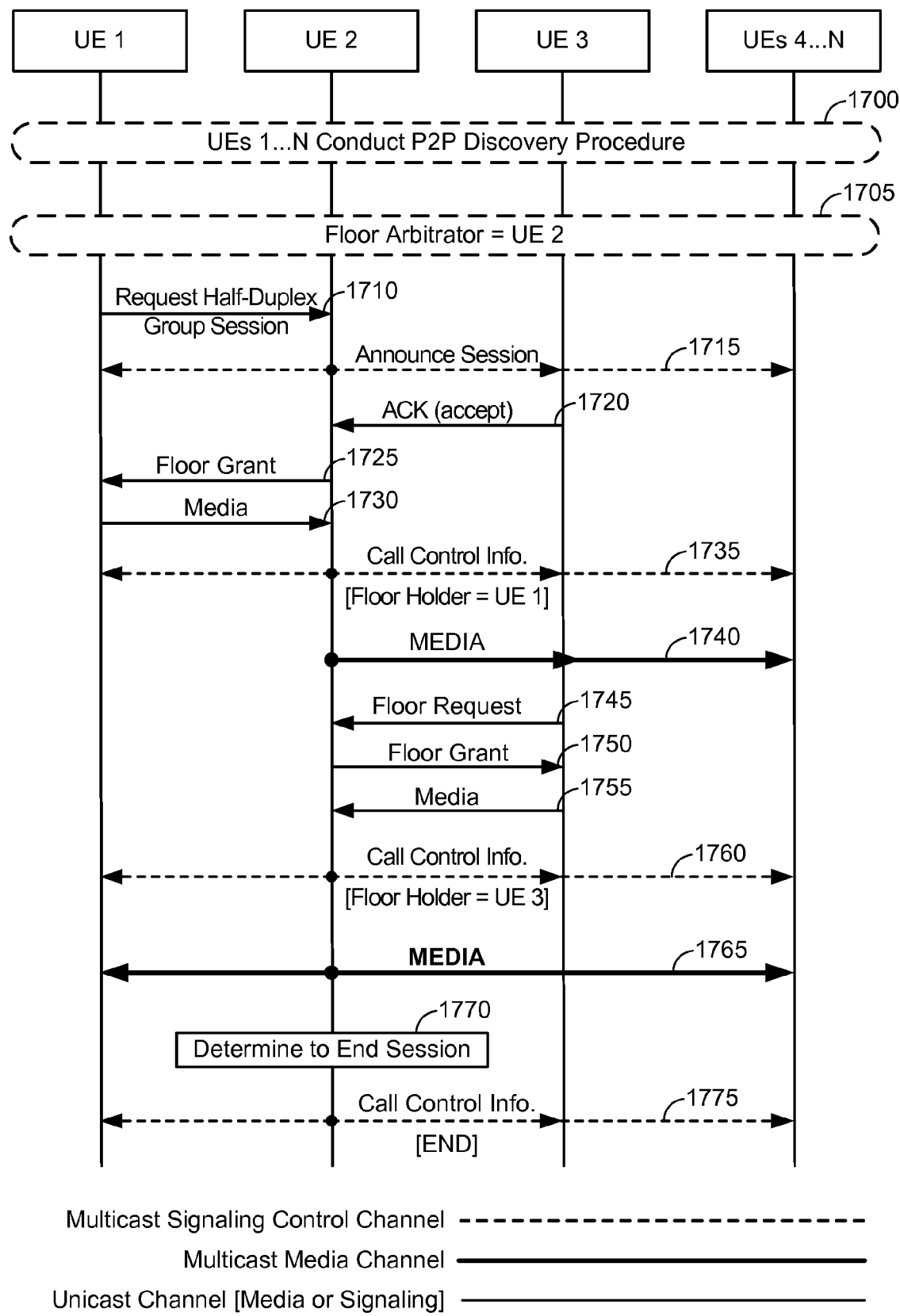
FIG. 17 illustrates an example implementation of the process of FIG. 16 in accordance with an embodiment of the invention.
Figure 18:
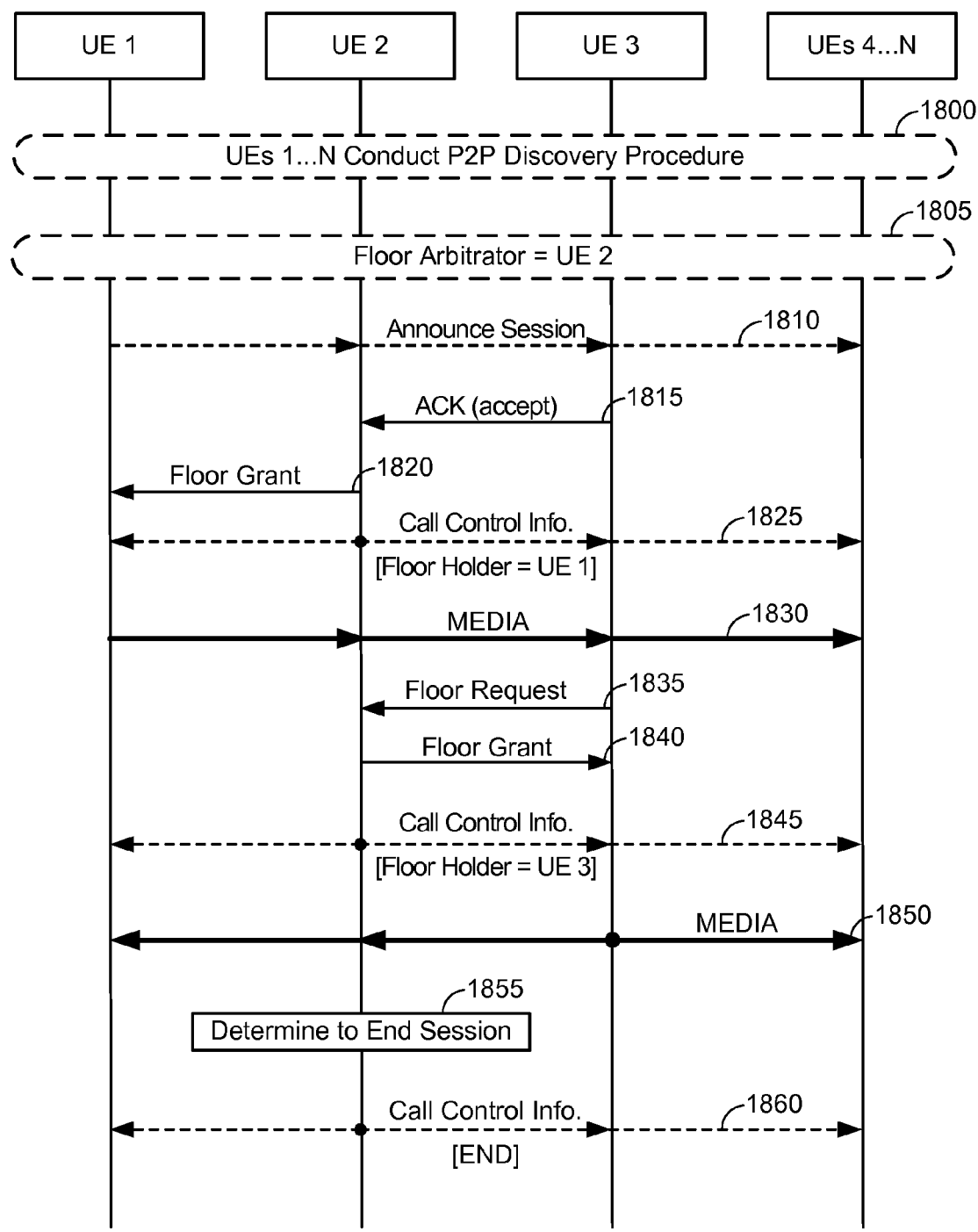
FIG. 18 illustrates an example implementation of the process of FIG. 16 in accordance with another embodiment of the invention.

Referring to FIG. 16, the P2P device exchanges signaling with one or more of the discovered P2P devices over a multicast signaling control channel of the P2P interface using the multicast address determined at 1605, 1610. In particular, the multicast signaling control channel is defined based on the usage of the multicast address, so the multicast channel could overlap with the discovery channel in terms of physical resources (e.g., frequency allocation, etc.) while being distinguished from the discovery channel by virtue of the multicast address. As will be described in greater detail below, the signaling exchanged at 1610 over the multicast signaling control channel can be exchanged before setup of a P2P session (e.g., for leader or floor arbitrator selection, heartbeats, etc.) or during the P2P session (e.g., for in-session signaling such as call announcements, floor change notifications, floor arbitrator change notifications, call termination notifications, etc.). Also, the multicast signaling control channel is not necessarily the only control channel used for signaling with the P2P group, as a unicast channel can also be used for signaling (e.g., to exchange one-to-one signaling messages such as session origination messages, floor request messages, floor grant messages, and so on). As used herein, a "unicast channel" in FIGS. 16-18 is any P2P connection established between two P2P nodes, any reference to "the unicast channel" simply implies that the two referenced P2P nodes are communicating via a point-to-point communication and not to imply any particular physical resource commonality to another unicast channel used between a different pair of P2P nodes. In a further example, the multicast signaling control channel can be a "dedicated" multicast signaling control channel that only includes signaling messages (no media). However, in another example, it is also possible that at least media be sent using the multicast channel. Generally speaking, however, media will be sent using a separate media channel so that the P2P devices can distinguish between signaling data using the multicast address.

In another example, separate multicast addresses can be generated for delivering different types of data using the same approach or a similar approach as described above with respect to the Group ID hashing procedure using either a different application specific string, thereby resulting in a different multicast address once combined with the hashed Group ID. For example, each P2P device registered to the P2P group can be provisioned with multiple application-specific strings that are each associated with a particular data type (e.g., control signaling, in-call signaling, call set-up signaling, media or any combination thereof). This permits independent derivation of multiple multicast addresses at the respective P2P devices. So, the "multicast signaling control channel" can use several different multicast addresses (e.g., two or more multicast addresses for control signaling, in-call signaling, call set-up signaling or any combination thereof) or a single multicast address for any type of multicast signaling (e.g., a single multicast addressed used by the P2P group for control signaling, in-call signaling and call set-up signaling). As another example, while not strictly necessary in all embodiments, multicast media transmissions can also use a multicast address that is independently derived using an application-specific string for media combined with a hash of the Group ID 715B.

After the P2P discovery procedure of 1600, the P2P device identifies a leader for the P2P group that is responsible for performing a floor arbitration function for any P2P session that originates with the P2P group, 1615. In an example, the leader identification at 1615 can occur using the procedure described above with respect to 1205-1220 of FIG. 12, although this is merely one possible implementation for the identifying of 1600, as a modified version of the leader selection schemes described with respect to FIGS. 8-9 could also be used at 1615. In a further example, instead of relying upon an exchange of unicast messages to facilitate the leader identification at 1615, the multicast signaling control channel could be used (at least in part) for this purpose. For an example, if the leader identification of 1615 is actually implemented as discussed above with respect to 1205-1220 of FIG. 12, the multicast signaling control channel could be used to exchange the reachability vectors at 1210, to exchange messages (e.g., leader announcement message, tie-breaker messages, etc.) implemented with respect to 1215 and/or to send the leader confirmation message at 1220.

The purpose of the leader selection of 1615 is specifically to identify the P2P device that will be responsible (at least initially) for performing a floor arbitration function for a half-duplex group communication session via P2P (or P2P session). However, the selected leader can also optionally act as a media relay to accommodate multi-hop network topologies. Accordingly, at some point after the leader is selected at 1615 (which can be delayed somewhat, as the floor arbitrator or leader can potentially be identified before any P2P device actually wants to originate a P2P session), the P2P device participates in the P2P session by exchanging media with the P2P group in accordance with the floor arbitration function performed by the selected leader (would could potentially be the P2P device itself, or alternatively one of the other P2P devices), 1620. As will be appreciated, exchanging media with the P2P group at 1620 implies that the P2P device is either transmitting media to the rest of the P2P group that joined the P2P session as the floorholder of the P2P session, or is receiving media from the current floorholder of the P2P session. Optionally, the floor arbitration function may be transferred from the selected leader to a different P2P device at some point during the P2P session, 1625. For example, 1615 of FIG. 16 may be repeated during the P2P session with a new P2P device being identified to perform the floor arbitration function to ensure that the selected leader is still appropriate to handle the floor arbitration function. In another example, the selected leader may move out of range and drop out of the P2P session altogether, which necessitates a new leader to be selected. For example, the selected leader may transmit a "heartbeat" (i.e., a periodic keep-alive message) using the multicast signaling control channel, a new leader may be selected or identified whenever the heartbeat gets too weak or simply stops altogether. In an example, the heartbeat can be transmitted on the multicast signaling control channel exclusively by the current floor arbitrator, or by a subset of nodes (e.g., the floor arbitrator plus any floor arbitrator back-ups and/or one or more other proxy nodes).

FIG. 17 illustrates an example implementation of the process of FIG. 16 in accordance with an embodiment of the invention. In particular, FIG. 17 illustrates an example whereby the floor arbitrator functions as a media relay for a P2P session conducted over a "star" network topology similar to the P2P network topology 1100A from FIG. 11A, whereby media is first routed by a current floorholder to the floor arbitrator via unicast, and then re-transmitted by the floor arbitrator to the P2P group via a multicast media channel. As noted above, in a star network topology, at least one P2P node is in direct communication range of each other P2P group member, so the process of FIG. 17 only has the floor arbitrator acting as the media relay without any secondary relay points as may be necessary in a multi-hop network topology.

Referring to FIG. 17, UEs 1 . . . N conduct a P2P discovery procedure over the discovery channel over the multicast interface of the P2P interface, 1700 (e.g., as in 1600 of FIG. 16). At this point, assume 1605-1615 of FIG. 16 are performed by each of UEs 1 . . . N, with UE 2 ultimately being identified as the leader that is responsible for performing the floor arbitration function for any P2P sessions involving the P2P group, 1705. Any messaging associated with the establishment of the floor arbitrator at 1705 may be carried on the multicast signaling control channel, although it is possible that at least some of the messaging is carried on one or more unicast channels.

At some later point in time, UE 1 determines to originate a half-duplex group communication session (or P2P session), and sends a session origination message to UE 2 via a unicast channel (e.g., analogous to an uplink message delivered from a client device to a server in a server-arbitrated system), 1710. UE 2 receives the session origination message and announces the P2P session over the multicast signaling control channel, 1715. UE 3 acknowledges the session announcement on the unicast channel and indicates acceptance (willingness to join) the P2P session, 1720, UE 2 sends a floor grant message to UE 1 on the unicast channel, 1725, and UE 1 begins to stream media to UE 2 on the unicast channel, 1730. While not shown explicitly, assume that UEs 4 . . . N also ACK the session announcement on the unicast channel in order to join the P2P session.

UE 2 transmits call control information (e.g., indicating that UE 1 is the floorholder for the P2P session, potentially including information to help identify and/or tune to the multicast media channel, etc.) to the P2P group over the multicast signaling control channel, 1735. UE 2 then begins to transmit UE 1's media to the P2P group over the multicast media channel, which is separate from the multicast signaling control channel as noted above, 1740.

At some later point during the P2P session, UE 3 sends a floor request to UE 2 on the unicast channel, 1745, and UE 2 sends a floor grant to UE 3 on the unicast channel, 1750. UE 1 stops sending media to UE 2 at this point for transmission to the P2P group, and UE 3 begins to stream media to UE 2 on the unicast channel, 1755. UE 2 transmits call control information (e.g., indicating that UE 3 is the new floorholder for the P2P session, etc.) to the P2P group over the multicast signaling control channel, 1760. UE 2 then begins to transmit UE 3's media to the P2P group over the multicast media channel, 1765. At some later point in time during the P2P session, UE 2 determines to end the P2P session, 1770. UE 2 transmits call control information to end the P2P session to the P2P group over the multicast signaling control channel, 1775, after which the P2P session is terminated.

FIG. 18 illustrates an example implementation of the process of FIG. 16 in accordance with another embodiment of the invention. FIG. 18 illustrates an example whereby each floorholder transmits media to the P2P group directly via the multicast media channel as opposed to using the floor arbitrator as a media relay for a P2P session as in FIG. 17. For example, the process of FIG. 18 may be suitable to the P2P network topology 1000 shown in FIG. 10, where each P2P device is in direct communication range of each other P2P device in the P2P group.

Referring to FIG. 18, UEs 1 . . . N conduct a P2P discovery procedure over the discovery channel of the P2P interface, 1800 (e.g., as in 1600 of FIG. 16). At this point, assume 1605-1615 of FIG. 16 are performed by each of UEs 1 . . . N, with UE 2 ultimately being identified as the leader that is responsible for performing the floor arbitration function for any P2P sessions involving the P2P group, 1805. Any messaging associated with the establishment of the floor arbitrator at 1805 may be carried on the multicast signaling control channel, although it is possible that at least some of the messaging is carried on one or more unicast channels.

At some later point in time, UE 1 determines to originate a half-duplex group communication session (or P2P session), and sends a session origination message to UE 2 to the P2P group via the multicast signaling control channel (e.g., analogous to a downlink call announce message delivered from the server to a group of target UEs in a server-arbitrated system), 1810. UE 3 acknowledges the session announcement to the floor arbitrator (i.e., UE 2) on the unicast channel and indicates acceptance (willingness to join) the P2P session, 1815, UE 2 sends a floor grant message to UE 1 on the unicast channel, 1820, and UE 2 transmits call control information (e.g., indicating that UE 1 is the floorholder for the P2P session, potentially including information to help identify and/or tune to the multicast media channel, etc.) to the P2P group over the multicast signaling control channel, 1825. UE 1 then begins to transmit media to the P2P group over the multicast media channel, 1830. While not shown explicitly, assume that UEs 4 . . . N also ACK the session announcement on the unicast channel in order to join the P2P session.

At some later point during the P2P session, UE 3 sends a floor request to UE 2 on the unicast channel, 1835, and UE 2 sends a floor grant to UE 3 on the unicast channel, 1840. UE 2 transmits call control information (e.g., indicating that UE 3 is the new floorholder for the P2P session, etc.) to the P2P group over the multicast signaling control channel, 1845. UE 1 stops sending media at this point, UE 3 begins to stream media to the P2P group over the multicast media channel as the new floorholder, 1850. At some later point in time during the P2P session, UE 2 determines to end the P2P session, 1855. UE 2 transmits call control information to end the P2P session to the P2P group over the multicast signaling control channel, 1860, after which the P2P session is terminated. While FIGS. 17-18 show the unicast channel being used to carry floor grant messages, it will be appreciated that the unicast channel could also be used to carry floor denial (or rejection) messages if the floor arbitrator determines not to grant a particular floor request.

While FIGS. 17-18 show the unicast channel being used to carry certain signaling that is primarily intended for one recipient (e.g., floor request messages, floor grant messages, unicast media for relay, etc.), it will be appreciated that any or all of these data could alternatively be transmitted using the multicast signaling control channel in other embodiments of the invention. Accordingly, the degree to which the multicast signaling control channel is used (or not used) can vary by implementation, although the multicast signaling control channel would likely be used to carry signaling data that is targeted to multiple P2P targets, although some P2P network topologies may reduce the benefit that is gained from the multicast signaling control channel over the unicast channel(s).

Further, for any of the embodiments discussed above with respect to FIGS. 12-18, "mixed mode" support can be used to extend the above-described P2P sessions to one or more UEs that cannot support multicasting with the rest of the P2P group via the P2P interface. For example, using the P2P network topology 1100C from FIG. 11C as an example, U6 may move out of direct communication range of U4 and thereby lose its connection to the P2P group via the P2P interface. In this case, U6 can attempt to connect to the RAN 120 and be "patched" into the P2P session via another P2P device (e.g., the leader or some other P2P device in the P2P group can also maintain a RAN connection for streaming media to or from any mixed mode participants, etc.). If U6 re-enters P2P range at some later point in time while the P2P session is still active, U6 can transition from being a mixed-mode participant back to being a P2P participant over the P2P interface for the P2P session. In another example, U6 may remain in direct communication range with U4 but may simply not have the capacity to support multicast via P2P for media and/or signaling (e.g., the multicast address or multicast address derivation algorithm may not have been provisioned on U6, etc.). In this case, any multicast messaging that cannot be decoded by U6 can be separately transmitted to U6 via unicast. Likewise, any messaging originating from U6 that would normally be sent via multicast by other P2P group members can be re-transmitted by U4 (or some other P2P group member) via multicast.

While the above-described embodiments are described with respect to LTE-D in part, it will be appreciated by one of ordinary skill in the art that the above-described embodiments can be implemented with respect to any D2D P2P technology or interface (e.g., LTE-D, WFD, Bluetooth, near field communication (NFC), etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a peer-to-peer (P2P) device that belongs to a P2P group, comprising:
    engaging in a P2P discovery procedure for discovering P2P devices that also belong to the P2P group;
    calculating a reachability vector that indicates each discovered P2P device in the P2P group that is within a threshold number of hops to the P2P device via a P2P interface;
    receiving a reachability vector for each proximate P2P device in a set of proximate P2P devices discovered via the P2P discovery procedure, each received reachability vector indicating each P2P device in the P2P group that is within the threshold number of hops to the proximate P2P device via the P2P interface;
    ranking the P2P device and each proximate P2P device in the set of proximate P2P devices based on the calculated and received reachability vectors;
    identifying a leader that is responsible for performing a floor arbitration function for a P2P session from the ranked P2P devices based on the rankings; and
    participating in the P2P session by exchanging media in accordance with the floor arbitration function performed by the leader.

2. The method of claim 1, wherein the threshold number of hops is 1 such that the calculated reachability vector and the received reachability vectors each indicate a subset of the discovered P2P devices that is in direct communication range with the P2P device.

3. The method of claim 1,
    wherein the received reachability vectors are received from each proximate P2P device within the threshold number of hops to the P2P device, or
    wherein the received reachability vectors are received from each of the discovered P2P devices.

4. The method of claim 1,
    wherein the set of proximate P2P devices include each proximate P2P device within the threshold number of hops to the P2P device, or
    wherein the set of proximate P2P devices include each of the discovered P2P devices.

5. The method of claim 1, wherein the calculated reachability vector indicates a set of reachability values between the P2P device and each discovered P2P device in the P2P group that is within the threshold number of hops to the P2P device via the P2P interface.

6. The method of claim 5, wherein one or more reachability values in the set of reachability values are weighted based on a resource parameter that indicates a degree to which resources can be allocated by one or more of the discovered P2P devices to the P2P device and/or a scaling factor that indicates a relative preference between reachability and resource availability in terms of leader identification.

7. The method of claim 6, wherein the resource parameter is based upon device-type, connectivity-type, operating system (OS)-type, battery life, an expected time a given P2P device is expected to stay connected to the P2P group via the P2P interface, a capacity to act as a relay for forwarding media and/or signaling, mobility of the given P2P device, whether a location of the given P2P device is in proximity to an area of interest and/or any combination thereof.

8. The method of claim 6, wherein a higher value for the scaling factor functions to weight the one or more reachability values more heavily based on reachability whereas a lower value for the scaling factor functions to weight the one or more reachability values more heavily based on resource availability.

9. The method of claim 1, wherein the ranking includes:
    constructing a reachability matrix using the calculated and received reachability vectors,
    generating, for each of the P2P device and the set of proximate P2P devices, a set of leader scores based on the reachability matrix, and
    wherein the leader corresponds to a given P2P device with a highest leader score from the set of leader scores.

10. The method of claim 9, wherein the given P2P device is the only P2P device in the reachability matrix with the highest leader score.

11. The method of claim 10, wherein at least one other P2P device in the reachability matrix also has the highest leader score.

12. The method of claim 11,
wherein a tie-breaking procedure is performed to identify only one of the given P2P device and the at least one other P2P device as the leader, or
wherein the given P2P device and the at least one other P2P device are both identified as leaders.

13. The method of claim 1, wherein the identifying includes:
selecting the leader locally at the P2P device, or
receiving a leader confirmation message over the P2P interface that indicates the leader.

14. The method of claim 1, wherein the engaging, calculating, receiving, ranking and identifying are triggered by one or more of:
a manual instruction from a member of the P2P group,
detection of a threshold number of P2P devices registered to the P2P group being in proximity to the P2P device,
external signaling from one or more other proximate P2P devices in the P2P group,
one or more rules that are either user-specified or based on machine learning, or
any combination thereof.

15. The method of claim 14, wherein the one or more rules instruct the P2P device to perform the engaging, calculating, receiving, ranking and identifying in response to one or more of:
a location of the P2P device, and/or
one or more measured environmental parameters.

16. The method of claim 15, wherein the one or more measured environmental parameters include time, ambient temperature, ambient brightness level, ambient noise level and/or ambient humidity level.

17. The method of claim 1, wherein the P2P discovery procedure indicates that the discovered P2P devices are arranged in one of:
a single-hop network topology where the P2P device and each of the discovered P2P devices are in direct communication range with each other, or
a star network topology where at least one and less than all of the P2P device and each of the discovered P2P devices are in direct communication range with each other, or
a multi-hop network topology where none of the P2P device or the discovered P2P devices are in direct communication range with each other.

18. The method of claim 1, further comprising:
detecting, during the P2P session, a transition of the floor arbitration function to a new leader; and
continuing participation in the P2P session by exchanging media in accordance with the floor arbitration function performed by the new leader.

19. The method of claim 18, wherein the transition of the floor arbitration function occurs in response to one or more of:
the leader dropping out of the P2P session,
the leader or a proxy of the leader failing to provide a heartbeat signal over the P2P interface,
one or more new P2P devices joining the P2P session,
one or more current P2P session participants moving to one or more new locations during the P2P sessions, or
any combination thereof.

20. The method of claim 18, wherein the new leader is a back-up leader that was identified by the identifying along with the leader.

21. The method of claim 1,
wherein the leader is an initial leader of the P2P session that is identified prior to or during setup of the P2P session, or
wherein the leader is a supplemental leader of the P2P session that takes over responsibility for performing the floor arbitration function for the P2P session during the P2P session from another P2P device that previously acted as the leader for the P2P session.

22. The method of claim 1,
wherein the P2P device is the leader, or
wherein the P2P device is not the leader.

23. The method of claim 1, wherein the P2P device is the leader, further comprising:
receiving one or more floor requests from at least one participating P2P device during the P2P session; and
selectively granting or denying the one or more floor requests.

24. The method of claim 1, wherein the P2P device is not the leader and does not hold a floor for the P2P session, further comprising:
transmitting one or more floor requests to the leader during the P2P session; and
receiving a grant or denial of the one or more floor requests from the leader.

25. The method of claim 1, wherein the P2P interface is a Long Term Evolution-Direct (LTE-D) interface.

26. The method of claim 1, wherein mixed-mode support for the P2P session is extended to at least one P2P device in the P2P group that is proximate to the P2P device that is incapable of receiving multicast signaling and/or media via unicast.

27. The method of claim 1, wherein mixed-mode support for the P2P session is extended to at least one remote P2P device that is not proximate to the P2P device via an external network connection between the at least one remote P2P device and at least one proximate P2P device in the P2P group that is participating in the P2P session.

28. A peer-to-peer (P2P) device that belongs to a P2P group, comprising:
means for engaging in a P2P discovery procedure for discovering P2P devices that also belong to the P2P group;
means for calculating a reachability vector that indicates each discovered P2P device in the P2P group that is within a threshold number of hops to the P2P device via a P2P interface;
means for receiving a reachability vector for each proximate P2P device in a set of proximate P2P devices discovered via the P2P discovery procedure, each received reachability vector indicating each P2P device in the P2P group that is within the threshold number of hops to the proximate P2P device via the P2P interface;
means for ranking the P2P device and each proximate P2P device in the set of proximate P2P devices based on the calculated and received reachability vectors;
means for identifying a leader that is responsible for performing a floor arbitration function for a P2P session from the ranked P2P devices based on the rankings; and
means for participating in the P2P session by exchanging media in accordance with the floor arbitration function performed by the leader.

29. A peer-to-peer (P2P) device that belongs to a P2P group, comprising:
logic configured to engage in a P2P discovery procedure for discovering P2P devices that also belong to the P2P group;

logic configured to calculate a reachability vector that indicates each discovered P2P device in the P2P group that is within a threshold number of hops to the P2P device via a P2P interface;

logic configured to receive a reachability vector for each proximate P2P device in a set of proximate P2P devices discovered via the P2P discovery procedure, each received reachability vector indicating each P2P device in the P2P group that is within the threshold number of hops to the proximate P2P device via the P2P interface;

logic configured to rank the P2P device and each proximate P2P device in the set of proximate P2P devices based on the calculated and received reachability vectors;

logic configured to identify a leader that is responsible for performing a floor arbitration function for a P2P session from the ranked P2P devices based on the rankings; and logic configured to participate in the P2P session by exchanging media in accordance with the floor arbitration function performed by the leader.

30. A non-transitory computer-readable medium containing instructions stored thereon, which, when executed by a peer-to-peer (P2P) device that belongs to a P2P group, cause the P2P device to perform operations, the instructions comprising:

at least one instruction to cause the P2P device to engage in a P2P discovery procedure for discovering P2P devices that also belong to the P2P group;

at least one instruction to cause the P2P device to calculate a reachability vector that indicates each discovered P2P device in the P2P group that is within a threshold number of hops to the P2P device via a P2P interface;

at least one instruction to cause the P2P device to receive a reachability vector for each proximate P2P device in a set of proximate P2P devices discovered via the P2P discovery procedure, each received reachability vector indicating each P2P device in the P2P group that is within the threshold number of hops to the proximate P2P device via the P2P interface;

at least one instruction to cause the P2P device to rank the P2P device and each proximate P2P device in the set of proximate P2P devices based on the calculated and received reachability vectors;

at least one instruction to cause the P2P device to identify a leader that is responsible for performing a floor arbitration function for a P2P session from the ranked P2P devices based on the rankings; and at least one instruction to cause the P2P device to participate in the P2P session by exchanging media in accordance with the floor arbitration function performed by the leader.

* * * * *